United States Patent
Viswanathan Iyer et al.

(10) Patent No.: US 11,665,169 B2
(45) Date of Patent: May 30, 2023

(54) SYSTEM AND METHOD FOR SECURELY MANAGING RECORDED VIDEO CONFERENCE SESSIONS

(71) Applicant: Dell Products, LP, Round Rock, TX (US)

(72) Inventors: Vivek Viswanathan Iyer, Austin, TX (US); Todd E. Swierk, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 151 days.

(21) Appl. No.: 17/160,707

(22) Filed: Jan. 28, 2021

(65) Prior Publication Data
US 2022/0239655 A1 Jul. 28, 2022

(51) Int. Cl.
| | |
|---|---|
| H04L 21/00 | (2006.01) |
| H04L 9/40 | (2022.01) |
| H04N 5/76 | (2006.01) |
| G06F 21/45 | (2013.01) |
| G06N 3/04 | (2023.01) |

(52) U.S. Cl.
CPC ............ *H04L 63/102* (2013.01); *G06F 21/45* (2013.01); *H04L 63/083* (2013.01); *H04L 63/105* (2013.01); *H04N 5/76* (2013.01); *G06F 2221/2107* (2013.01); *G06N 3/04* (2013.01)

(58) Field of Classification Search
CPC ... H04L 63/102; H04L 63/083; H04L 63/105; G06F 21/45; G06F 2221/2107; H04N 5/76; G06N 3/04
See application file for complete search history.

(56) References Cited

U.S. PATENT DOCUMENTS

| | | | |
|---|---|---|---|
| 8,228,360 B2 | 7/2012 | Hamilton | |
| 8,260,854 B2 | 9/2012 | Cockerton | |
| 8,736,662 B2 | 5/2014 | Swanson | |
| 9,178,876 B1 * | 11/2015 | Johansson | ............... G06F 21/00 |
| 9,589,127 B2 | 3/2017 | Copsey | |
| 10,033,726 B2 * | 7/2018 | Arai | ...................... H04L 63/102 |
| 10,264,217 B2 | 4/2019 | Pepperell | |
| 10,277,643 B2 | 4/2019 | Lee | |

(Continued)

*Primary Examiner* — Don G Zhao
(74) *Attorney, Agent, or Firm* — Prol Intellectual Property Law, PLLC; H. Kenneth Prol

(57) ABSTRACT

A host server information handling system executing a multimedia multi-user collaboration application (MMCA) may include a processor; a memory; a power management unit; a network interface device to receive and provide audio/visual (AV) data during execution of the MMCA for a video conference session; the processor configured to execute a collaborative rights information management system to: manage the recordation of a video conference session during the execution of the MMCA to create a recording of the video conference session and assign a first password to protect the recording of the video conference session as a default password; assign a security level to the recording of the video conference session; and permit access, via the network interface device, to the recordings of the video conference session by transmitting the password to those users who are associated with a higher user access permission level than the aggregated user access permissions and are authorized to access the recording.

20 Claims, 6 Drawing Sheets

(56) References Cited

U.S. PATENT DOCUMENTS

| | | | | |
|---|---|---|---|---|
| 10,846,385 B1* | 11/2020 | Walters | | G06F 21/40 |
| 11,075,920 B2* | 7/2021 | O'Toole | | G06F 3/0673 |
| 2001/0037459 A1* | 11/2001 | Ogawa | | G11B 27/105 |
| 2003/0070072 A1 | 4/2003 | Nassiri | | |
| 2003/0144963 A1* | 7/2003 | Saito | | H04L 9/088 |
| | | | | 348/E7.056 |
| 2007/0061873 A1* | 3/2007 | Shewchuk | | H04L 9/3213 |
| | | | | 726/10 |
| 2010/0251339 A1* | 9/2010 | McAlister | | G06F 21/604 |
| | | | | 726/4 |
| 2011/0055585 A1* | 3/2011 | Lee | | H04L 9/3218 |
| | | | | 713/183 |
| 2011/0061100 A1* | 3/2011 | Mattila | | G06F 21/36 |
| | | | | 345/173 |
| 2012/0278241 A1* | 11/2012 | Brown | | H04W 12/068 |
| | | | | 705/67 |
| 2013/0179949 A1* | 7/2013 | Shapiro | | G06Q 30/0603 |
| | | | | 726/4 |
| 2014/0113592 A1* | 4/2014 | Wu | | H04L 12/6418 |
| | | | | 455/411 |
| 2014/0282978 A1* | 9/2014 | Lerner | | H04L 63/083 |
| | | | | 726/7 |
| 2014/0340469 A1 | 11/2014 | Swanson | | |
| 2014/0344918 A1* | 11/2014 | Choi | | G06F 21/88 |
| | | | | 726/16 |
| 2015/0006698 A1 | 1/2015 | Aono | | |
| 2015/0006699 A1 | 1/2015 | Aono | | |
| 2015/0220715 A1* | 8/2015 | Kim | | G06F 21/32 |
| | | | | 726/18 |
| 2016/0134619 A1* | 5/2016 | Mikheev | | H04W 4/60 |
| | | | | 726/8 |
| 2017/0048275 A1 | 2/2017 | John | | |
| 2018/0000367 A1* | 1/2018 | Longinotti-Buitoni | | G06F 1/163 |
| 2019/0384941 A1 | 12/2019 | Anderson | | |
| 2020/0007554 A1* | 1/2020 | Vincent | | G06F 21/31 |
| 2020/0112585 A1* | 4/2020 | Keohane | | H04L 9/3226 |
| 2022/0200800 A1* | 6/2022 | Xu | | G06F 21/6227 |

* cited by examiner

SYSTEM AND METHOD FOR SECURELY MANAGING RECORDED VIDEO CONFERENCE SESSIONS

FIELD OF THE DISCLOSURE

The present disclosure generally relates to multi-user collaboration applications such as video conference applications. More specifically, the present disclosure relates to securely managing recording of video conference sessions during and after the video conference session executed by the multi-user collaboration application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
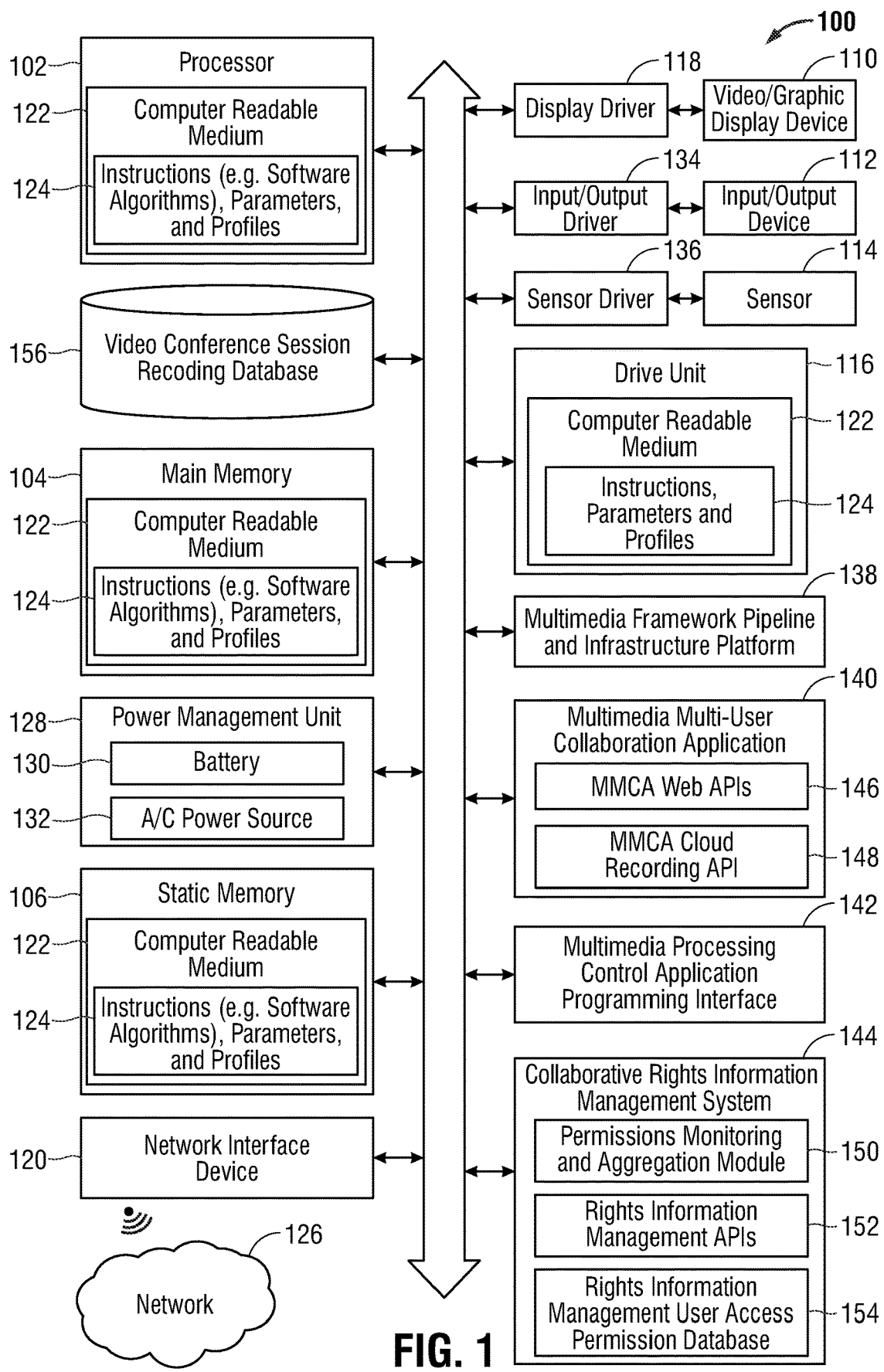
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include a large number of people, sometimes exceeding 50 or 100 participants. In many cases, only one or a handful of meeting participants are actively engaged in the meeting, as presenters, or as active participants in a discussion, for example. During these video conferences, a recoding may be made so that others may access the video, whether they attended the video conference in real-time or not, in order to review the contents presented and what was said. Occasionally, what was said or presented during the video conference session may include topics that are sensitive in nature or otherwise confidential to those participating. By way of example, a company may communicate with various vendors via video conference and the issues discussed as well as the data presented in these video conference sessions may want to remain confidential to those presenting such data. By recording this video conference meeting the company may maintain a record of what was discussed. However, some of those participants may not need or should be prevented from accessing the data again by reviewing the recording. The present specification describes a system and method that secures these recordings of a video conference by limiting access to a subset of participants within the video conference session by assigning a password to access that recording. Certain participants may be provided access by receiving the password based on the participants' user access permission levels associated with those participants.

In some embodiments, an aggregation of user access permissions associated with each user accessing the video conference session may be retrieved and, based on any changes to the aggregated user access permission based on who participates in the video conference session at various points during the video conference session, a second or replacement password may be assigned to the recording thereby securing that recording to only those users who have the requisite user access permission level. The changes in the aggregated user access permissions may occur when a participant having a lower user access permission level joins the video conference. In this case, the relative user access permission levels cause the recordings to be secured using a password or a second replacement password, unknown to the participant having a lower user access permission level that is assigned to the recording. In other aspects, some encryption may be provided with or instead of a second password to all those with a higher user access permission level to access all portions or higher security level portions of the recording. In some embodiments, the participant having a lower user access permission level may be allowed to access certain segments of the video conference session that are deemed to not include confidential or sensitive materials or that were attended by that participant.

Embodiments of the present disclosure provide for an executing a multimedia multi-user collaboration application (MMCA) in order to initiate the video conference session. The execution of the MMCA allows for the plurality of users to participate in a video conference session by presenting presentations, listening to the discussion, viewing the presentations, and providing oral and visual feedback to the other users. The information handling system may include a memory, a power management unit (PMU) to provide power to the information handling system, a camera to capture video of the user a microphone to capture audio of the information handling system participating in the video conference session.

In an embodiment, the information handling system may be a host server information handling system that executes a multimedia multi-user collaboration application (MMCA) on behalf of a number of network information handling systems sometimes called client devices. The host server information handling system may include a network interface device to receive and provide audio/visual (AV) data during execution of the MMCA for a video conference session. The information handling system may execute a collaborative rights information management system that manages recordings of the video conference sessions and who can and cannot access any recorded segments of the video conference session. This management may be based on the user identification data and access permissions associated with each user accessing the video conference session, and aggregation of the user identification data and access permissions associated with each user accessing the video conference session, each user's sign-in and sign-out times, among other criteria that allows or restricts any participant or other user to gain access to the recorded video conference session or segments thereof.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, a host server hosting a video conference session by execution of a MMCA, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palm-top computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

The information handling system 100 described with reference to FIG. 1 may represent a transmitting (e.g., AV media data source) information handling system or a receiving (e.g., AV media data sink) information handling system in various embodiments. In still other embodiments, information handling system 100 may operate as both a transmitting and a receiving information handling system, as may be the case for an information handling system transmitting video of one participant user while simultaneously executing code instructions for the MMCA 140 to display videos of other participants within a shared user video conference session or relay those videos between the participants. In yet another embodiment, the information handling system 100 may operate remotely from all transmitting or receiving information handling systems while executing code instructions of the MMCA 140 to coordinate participation within a user session such as a MMCA control provider server information handling system. Additionally, some or all of the collaborative rights information management system 144 may operate on a server, blade, rack, or cloud-based network maintained and controlled by the manufacturer of several information handling systems, or managed by an employer or enterprise owner of several information handling systems. In another embodiment, the information handling system 100 may operate a performance optimizer system within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In some embodiments, each of the plurality of transmitting and receiving information handling systems participating within a user video conference session of the MMCA 140 may incorporate an agent or API for the collaborative rights information management system 144 when it is executed on a remote information handling system.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as the processor 102, a central processing unit (CPU), a graphics processing unit (GPU), hardware or software control logic, or any combination thereof. Additional components of the information handling system 100 can include one or more storage devices, one or more communications ports for communicating with external devices, as well as, various input/output (I/O) devices 112, such as a keyboard, a mouse, a video/graphic display 110, or any combination thereof. In an embodiment, the I/O devices 112 may each include an associated input/output driver 134 to be executed by the processor 102 in order to enable an operating system of the information handling system 100 and other computer programs to access hardware functions of the I/O devices 112. The information handling system 100 may further include a display driver 118 to enable an operating system of the information handling system 100 and other computer programs to access the video/graphics display device 110. The information handling system 100 can also include one or more buses 108 operable to transmit communications between the various hardware components. Portions of an information handling system 100 may themselves be considered information handling systems 100 in an embodiment.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), graphical processing unit (GPU), vision processing unit (VPU), gaussian neural accelerator (GNA) control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof) storing instructions 124 in computer readable medium 122 for the multimedia framework pipeline and infrastructure platform 138 (MFPIP), multimedia multi-user collaboration application 140 (MMCA), multimedia processing control application programming interface 142 (MPCAPI), and collaborative rights information management system 144. The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an I/O devices 112 used to interact with the graphics presented at the video/graphic display device 110, such as a cursor control device (e.g., mouse, touchpad, or gesture or touch screen input), and a keyboard. Also, I/O devices 112 include cameras, microphones, and speakers to capture or play back AV data of a video conference session via the MMCA 140.

The network interface device 120 can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wired or wireless data communication standards. To communicate with a wireless local area network, standards including IEEE 802.11 WLAN standards, IEEE 802.15 WPAN standards, or a WWAN via standards such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well as the NRFR1, NRFR2, bands, and other known bands. In an embodiment, the network interface device 120 with a wireless adapter may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard.

In some embodiments, software, firmware, dedicated hardware implementations such as application specific integrated circuits (ASICs), programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, the collaborative rights information management system 144 may be code sets with instructions 124 for performing various processing tasks to manage recordings during a video conference session. Further, in an exemplary, non-limited embodiment, implementations can include distributed processing, component/object distributed processing, and parallel processing. Alternatively, distributed computer system processing can be constructed to implement one or more of the methods or functionalities as described herein.

The present disclosure contemplates a computer-readable medium that includes instructions 124, parameters, and profiles or receives and executes instructions 124, parameters, and profiles responsive to a propagated signal, so that a device connected to a network 126 can communicate voice, video or data over the network 126. Further, the instructions 124 may be transmitted or received over the network 126 via the network interface device 120 or a wireless adapter, for example.

The information handling system 100 can include a set of instructions 124 that can be executed to cause the computer system to perform any one or more of the methods or computer-based functions disclosed herein. For example, instructions 124 may execute a collaborative rights information management system 144, a MPCAPI 142, a MMCA 140, a MFPIP 138, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116, main memory 104, and static memory 106, may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the collaborative rights information management system 144, MPCAPI 142, MMCA 140, MFPIP 138, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the collaborative rights information management system 144, MPCAPI 142, MMCA 140, MFPIP 138, may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The collaborative rights information management system 144, MPCAPI 142, MMCA 140, and/or MFPIP 138, may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 128 (a.k.a. a power supply unit (PSU)). The PMU 128 may manage the power provided to the components of the information handling system 100 such as the processor 102, a cooling system, one or more drive units 116, a graphical processing unit (GPU), the video/graphic display device 110, and other components that may require power when a power button has been actuated by a user. In an embodiment, the PMU 128 may be electrically coupled to the bus 108 to provide this power. The PMU 128 may regulate power from a power source such as a battery 130 or A/C power adapter 132. In an embodiment, the battery 130 may be charged via the A/C power adapter 132 and provide power the to the components of the information handling system 100 when A/C power from the A/C power adapter 132 is removed.

The information handling system 100 may also include a sensor 114 or a plurality of sensors 114 that may be operably connected to the bus 108. The sensor 114 may be associated with computer readable medium 122 that may also contain space for data storage in order to store, at least temporarily, data descriptive of the characteristics of a video frame during a video conference session executed by a MMCA 140 or characteristics of an environment the user is present within near the information handling system. The sensors 114 may be operatively coupled to a sensor driver 136 to be executed by the processor 102 in order to enable an operating system of the information handling system 100 and other computer programs to access hardware functions of the I/O devices 112.

In an embodiment, during execution of the MMCA 140 to engage a participant in a video conference session, the video frames received at the MFPIP 138 from a video camera may be used, in real-time to present streaming video to other client devices operatively coupled to the information handling system 100. The MFPIP 138 may make any adjustments to each video frame such as encoding, color corrections, virtual background overlaying, among other visual adjustments before sending that data out to the other network-connected information handling systems.

As described, the information handling system 100 may further include an MMCA 140. The MMCA 140 may be any application that, when executed by the processor 102, initiate a video conference session between a plurality of users such as between the user of the information handling system 100 and another remote user of another information handling system. MMCA 140 may utilize an MMCA central facility server, such as the information handling system 100 in an embodiment, to engage in the video conference. With the MFPIP 138 and MPCAPI 142 and per the operations of the collaborative rights information management system 144 described herein, the MMCA 140 may cause video frames to be transmitted to the MFPIP 138 for processing, reprocessing, encoding, decoding, capture, and display (e.g., via bus 108) and present each video frame to the user at the video/graphic display device 110. Examples of a MMCA 140 may include Zoom® developed by Zoom Video Communications®, Skype® developed by Skype Technologies of Microsoft®, Microsoft Teams® by Microsoft®, WebEx® developed by Cisco®, GoToMeeting® developed by LogMeIn®, among others.

The MMCA 140 may include any number of MMCA web APIs that defines how the MMCA 140 interacts with the MPCAPI 142, the MFPIP 138, and the collaborative rights information management system 144. The MMCA 140 also includes an MMCA cloud recording API that facilitates the recording of the video conference sessions for access by the collaborative rights information management system 144 to manipulate the recordings of the video conference session. Such manipulations may include assigning a user access permission level to view the video conference session or any of the segments thereof, as well as storing those video conference session recordings into the video conferencing session recording database 156.

The information handling system 100 may also include a MFPIP 138. The MFPIP 138 may be any video processing system of the information handling system 100 that, with the processor 102, executes AV detection processing instruction modules to detect, for example, blur, color vector, and compression artefacts within each of the video frames created as the video camera (e.g., webcam) as well as correct for any of these and any other visual errors within any given video frame.

In an embodiment, the information handling system 100 includes a multimedia multi-user collaboration application (MPCAPI) 142. The MPCAPI 142 in an embodiment may operate to facilitate communication between various applications, controllers, and drivers of the information handling system 100 in an embodiment. For example, the MPCAPI 142 may interface between the MFPIP 138 and the sensors 114. The MPCAPI 142 may, during operation of the information handling system 100, receive the individual video frames and direct the processor to execute the AV detection processing instruction modules to be executed. In an embodiment, the MPCAPI 142 may conduct an offloading process where the MPCAPI 142 has received, for example, processing instructions directing the offloading of processing from the processor 102 to another processing device such as a VPU, GPU, GNA, among others. For example, instead of using the processing resources associated with the processor 102, the MPCAPI 142 may, per the processing instructions, direct a graphical processing unit (GPU), vision processing unit (VPU), gaussian neural accelerator (GNA) control logic or some combination of the same to supply additional processing resources to, for example, increase the encoding/decoding rate of the image frames. This may allow for the processor 102 to engage in other processes during the video conference session executed by the MMCA 140 such as file sharing and chatting among other processes.

In an embodiment, the MFPIP 138, MMCA 140, MPCAPI 142, and collaborative rights information management system 144 may communicate with the main memory 104, the processor 102, the video/graphic display device 110, a keyboard, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation of the information handling system 100, the MMCA 140 may be executed or, alternatively, the information handling system 100 may act as the MMCA host server used to relay AV data among the client information handling systems described herein. During operation of the information handling system 100, the processor may execute a collaborative rights information management system 144. The collaborative rights information management system 144 may perform various processes used to record a video conference session, secure access to that video conference session, and, per automatically applied criteria, selectively allow and prevent users to access the recording. In the present specification and in the appended claims, the term "video conference session" is meant to be understood as the entire duration of the execution of the MMCA 140 that provides AV signals to be transmitted and received by a plurality of participants of the video conference session. Additionally, in the present specification and in the appended claims, the term "participant" is meant to be understood as any person who, via an information handling system, participates in a video conferencing session. Still further, in the present specification and in the appended claims, the term "user" is meant to be understood as any person who, via an information handling system, participates in the video conference session and/or implements the functions of an information handling system to attempt to gain access to a recording of a video conference session or segments thereof.

In an embodiment, the collaborative rights information management system 144 may manage the recordation of a video conference session during the execution of the MMCA 140 to create a recording of the video conference session. In one embodiment, the collaborative rights information management system 144 may assign a password to protect the recording of the video conference session in order to selectively prevent access to the recording by those users or even to those participants of the video conference session who have been identified as having a lower user access permission level than is allowed to view the recording. As described herein, some users and participants may be restricted from accessing the recording or segments of the recording even if the participants had and gained access to the video conference in real-time.

The collaborative rights information management system 144 may also, in an embodiment, monitor and aggregate user identification data and access permissions associated with each user accessing the video conference session during the execution of the MMCA 140 with the processor 102. This may be done by executing the permission monitoring and aggregation module 150 of the collaborative rights information management system 144. The participants who had been invited to participate in the video conference session may have specific access permissions associated with them or their user identification data indicating whether the participant is allowed to access a recording or a segment of the recording of the video conference session. In an embodiment, a rights information management API 152 may be executed on behalf of the permission monitoring and aggregation module 150 to retrieve the user identification data to be provided via a number of data sources such as from an email address used to access a hyperlink to the video conference session, an internet protocol (IP) address, a media access control (MAC) address, a phone number associated with the user, a unique password used by the user to access the video conference session, among others. Such user identification data may thus also indicate a level of a user within an organization or an affiliation of a user with one or more organizations. The information handling system 100 and specifically the collaborative rights information management system 144 may include a rights information management user access permission database 154 that includes each participants or user's identification data and associated access permissions of that user. In an embodiment, the rights information management user access permission database 154 may include data descriptive of employees of a company or other enterprise that regularly use the MMCA 140 to engage in video conference sessions with company-internal and company-external users. These access permissions may be set to any scale that places one type of participant or user with higher or lower access permissions relative to another type of participant or user. For example, in the context of a company organization, and enterprise directory may be accessed and used such that a CEO (e.g., regardless of the person holding that office) may be provided with the highest access permissions while others' access permissions may be set at a level comparative to the CEO. Some may be assigned, on the rights information management user access permission database 154, with equal access permissions while others may be assigned lower access permissions. Additionally, in the example where a non-employee of the company is invited to the video conference session, that non-employee will be assigned no access permissions or lower access permissions that may prevent the non-employee from accessing the video conference session recordings.

During execution by the processor, the collaborative rights information management system 144 may also monitor each user's sign-in and sign-out times with the user's identification data during the video conference session. In an embodiment, the collaborative rights information management system 144 may execute certain rights information management APIs that interface with the MMCA 140 to retrieve data describing when each participant enters the video conference session ("sign-in") and when each participant exits ("sign-out") the video conference session. This allows the collaborative rights information management system 144 and its permission monitoring and aggregation module 150 to add this data to the access permissions and user identifications as described.

The collaborative rights information management system 144, upon execution of the processor 102, may also determine changes to aggregated user access permissions associated with each user accessing the video conference session to include user identifications of users having lower user access permission level than is allowed to view the recording. As described, the video conference session recording may have a security level assigned that is met by those users who's access permissions met or exceed the security level of the recording. Users meeting or exceeding the security level may be provided with an access password automatically and any applicable decryption codes or other authorization measures for some or all of the recording is encrypted in some embodiments. During the video conference session, any users may be invited as participants to participate in the video conference session at any time. In some examples, during the video conference session an invite may be sent to a user inviting them to listen to and possibly engage in the remaining portion of the video conference session. As this occurs, the users may be informed that the video conference session is being recorded and the new participant may not provide permission for their AV to be recorded but may otherwise allow for the session to be recorded. Additionally, the user identification data associated with these new participants along with that user's access permissions may not be available or may be set to a level that is insufficient to allow that user to access any recordings or portions of the recording of the video conference session.

When this occurs, and changes to aggregated user access permissions has occurred, the collaborative rights information management system 144 may generate the password for access or generate a second password to replace the first default password to protect the recording of the video conference session based on the changes to the aggregated user access permissions associated with each user accessing the video conference session to exclude the user identifications having the lower user access permission level. Because the video conference session is being recorded each user may have been provided with a single password used to access the video conference session as well as to access any recordings made from that video conference session in an example embodiment. As such a participant who has an insufficiently low access permission to access the recording security level may have been provided with that information when logging into the video conference session in an example embodiment. Because of the inclusion of this lower user access permission level participant into the video conference session, the collaborative rights information management system 144 may generate a new password (e.g., a second password) in order to protect the recordings from being accessed by this lower user access permission level participant in such an embodiment.

The information handling system 100, during operation, may then permit access, via the network interface device, to the recordings of the video conference session by transmitting the second password to those user identifications of users who are associated with a higher user access permission level than the aggregated user access permissions and are authorized to access the recording. In an embodiment, a security level may be assigned to the video conference session recording requiring an access permission level at a threshold or higher level to receive the higher-level password (e.g., second password). This secures the recordings of the video conference session so that they may not be accessed by those who are not allowed.

In an embodiment, the collaborative rights information management system may separate the recording of the video conference session into a plurality of AV video conference segment session files based on each user's sign-in and sign-out times during the video conference session. In this embodiment, those participants or users that have lower user access permission levels to access some segments of the video conference session may otherwise have sufficient user access permission levels to access other segments. In this embodiment, the collaborative rights information management system, via the network interface device, may transmit the second password for accessing the whole recording when a first AV video conference segment session file has a security level requiring the user to have higher access permission level associated with these users' identification information. The lower user access permission level participants may be permitted to access other segments having a lower described security level using the first password or another alternative password that provides access to only those segments of the video conference session that their respective user access permission levels allow associated with these users' identification information. By segmenting the recordings of the video conference session into a plurality of AV video conference segment session files, any data that is to remain confidential may remain so while those discussion and interactions on the video conference session that are not particularly confidential may be shared with others who meet the requisite user access permission levels in an embodiment. Thus, the video conference session segments may have different security levels assigned with a plurality of passwords able to access various combinations of segments.

In another embodiment, the collaborative rights information management system may separate the recording of the video conference session into a plurality of AV video conference segment session files based on each user's sign-in and sign-out times, sensitivity of content discussed or shared, or a host description, via the GUI, during the video conference session as described herein. In this embodiment, the collaborative rights information management system 144 may also assign different security levels to the plurality of AV video conference segment session files and include the plurality of AV video conference session files with varying encryption for multiple different segments in the same video container allowing each user with access permission levels meeting the security levels of the AV video conference segment session files to access the plurality of AV video conference segment session files with corresponding decryption keys or other understood authorization measures. In this manner the collaborative rights information management system 144 may cause the recorded video conference sessions, regardless of how they are segmented, in the same video container and stored on a video conferencing session recording database 156 accordingly.

In an embodiment, as each user engages with and participates in the video conference session, their user identification data and associated user access permissions may be stored on a rights information management user access permission database 154 as described herein. Thus, although a particular company may maintain such a databased that includes all of their employees' data used to access the recordings of the video conference session, this rights information management user access permission database 154 may be continually updated as new participants in any video conference session are introduced. In some instances, a manager of the collaborative rights information management system 144 may manually alter the user access permission levels of any given participant after any video conference session indicating that their user access permission level has changed to allow more or less access to more or less of the recordings of the video conference session or segments thereof in some embodiments.

As described herein, the information handling system 100 may include or have access to a video conferencing session recording database 156. Additionally, each information handling system engaged in the video conference session may also be provided access to the video conferencing session recording database 156 as described herein and based on the user access permission levels. In an embodiment, the participants and other users may gain access to video conference session recordings or segments thereof upon confirmation from the collaborative rights information management system 144 that each user or participant has appropriate user access permission levels to gain such access.

Figure 2:
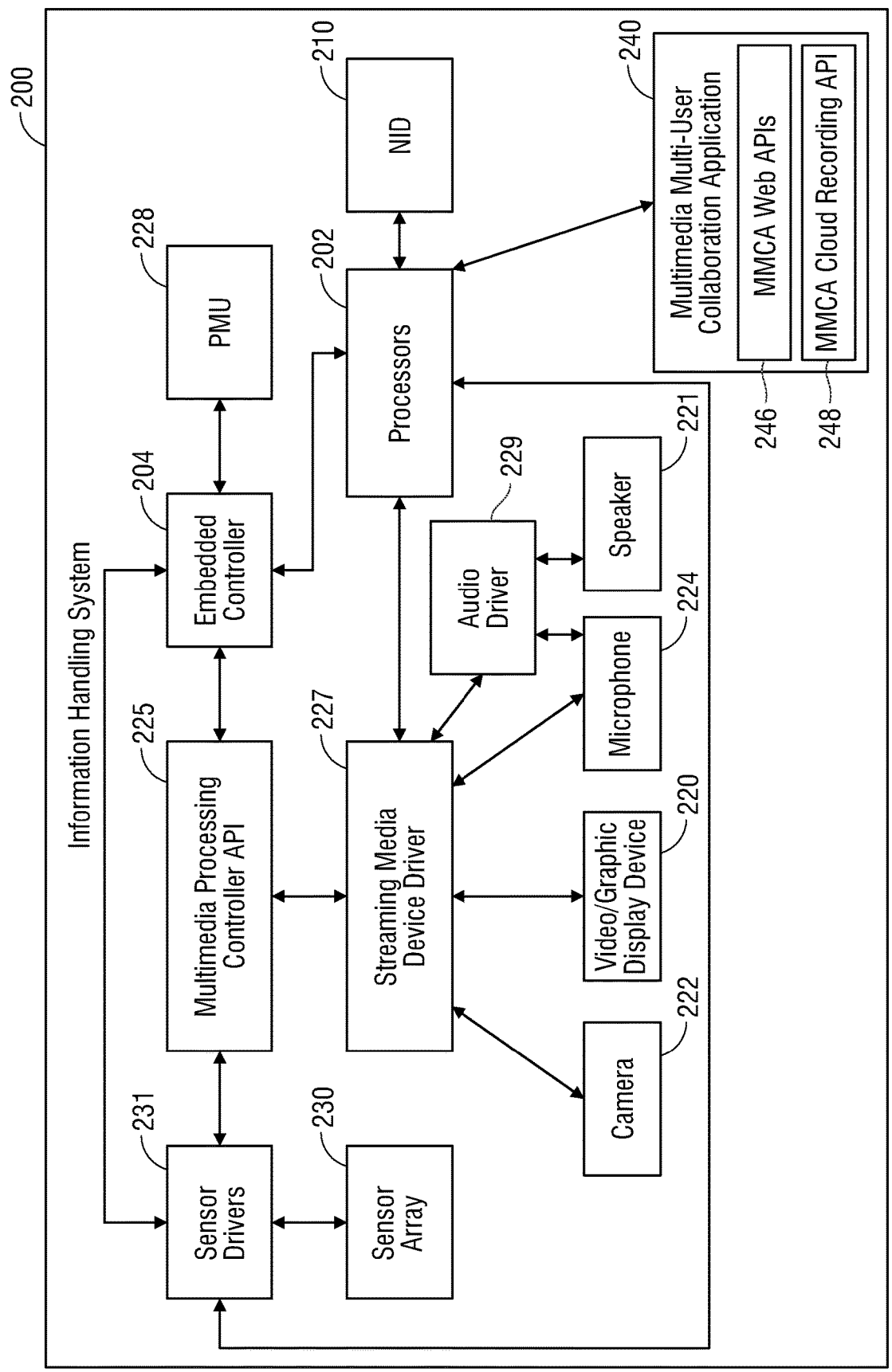
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices of an information handling system according to an embodiment of the present disclosure. FIG. 2 shows the operative couplings of a number of devices and processes present and executed within the information handling system 200 during operation of the information handling system 200. During operation, the information handling system 200 may be powered on via use of an on switch on the PMU 228. The PMU 228 may power on an embedded controller 204 that, in an embodiment, executes a basic input/output system (BIOS). The BIOS may also, in an embodiment, execute an operating system (OS).

As described herein, the information handling system 100 may include an MMCA 140. The MMCA 140 may be any application that, when executed by the processor 102, initiates and conducts a video conference session between a plurality of users such as between the user of the information handling system 100 and another remote user of another information handling system. MMCA 140 may utilize an MMCA central facility server, such as the information handling system 100 in an embodiment, to engage in the video conference. With the MFPIP 138 and MPCAPI 142 and per the operations of the collaborative rights information management system 144 described herein, the MMCA 140 may cause video frames to be transmitted to the MFPIP 138 for processing, reprocessing, encoding, decoding, capture, and display (e.g., via bus 108) and present each video frame to the user at the video/graphic display device 110.

Examples of a MMCA 140 may include Zoom® developed by Zoom Video Communications®, Skype® developed by Skype Technologies of Microsoft®, Microsoft Teams® by Microsoft®, WebEx® developed by Cisco®, GoToMeeting® developed by LogMeIn®, among others.

The MMCA 140 may include any number of MMCA web APIs that defines how the MMCA 140 interacts with the MPCAPI 142, the MFPIP 138, and the collaborative rights information management system 144. The MMCA 140 also includes an MMCA cloud recording API 248 that facilitates the recording of the video conference sessions. The collaborative rights information management system 144 may access and manipulate the recordings of the video conference session. Such manipulations may include assigning a security level to a video conference session recording to determine a minimum level of a user access permission level to view the video conference session recording or any of the segments thereof, as well as placing those video conference session recordings into the video conferencing session recording database 156.

The operation of the information handling system 200 may include operatively coupling the information handling system to a host server operating or facilitating the operation of the MMCA 140 in order to engage the user of the information handling system 200 in a video conference session. This may be facilitated by a network interface device (NID) 210 as described in connection with FIG. 1. In an embodiment, the information handling system 200 of FIG. 2 may be a client device that accesses the host server similar to that shown and described in FIG. 1 to engage in a video conference session.

In an embodiment, the MMCA 140 may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer remotely via the NID 210. The Dell® Optimizer® software application is one example of such an information handling system performance optimizer application. The information handling system performance optimizer application in such an embodiment may communicate with the embedded controller 204 to send user access permission levels and user identifications from each of the plurality of information handling systems (e.g., including 200) managed during communications between the information handling system performance optimizer application and all managed information handling systems operatively coupled to the host server (e.g., FIG. 1) to engage in a video conference session. Such communications with the embedded controller 204 in an embodiment may be used to check those user access permission levels for the user of the information handling systems (e.g., 200), and to push the user identifications to the host server information handling systems, for example.

In an embodiment, the camera 222 may acquire video frames and provide those frames to the streaming media device driver 227. An MFPIP may then transmit those video frames to the host server to provide those streaming AV video frames to other client information handling systems via the NID 210.

During the operation of the information handling system 200, drivers may be executed by the processor 202 to enable an OS of the information handling system 200 and other computer programs to access hardware functions of the I/O devices, sensors of the sensor array 230, and the camera 222, among others. These drivers working through a streaming media device driver 227 may help to facilitate the transmission of data from the individual sensors to the processor 202 or other processing device responsible for adjusting the visual composition of the video frames as described herein.

It is contemplated that the information handling system 200 may include one or more cameras 222 (e.g., one camera for each of a plurality of videoconference displays oriented at different angles to a user), one or more video/graphic displays (e.g., 220), one or more microphones 224 and one or more speakers 221. The streaming media driver 225 may also gather audio samples recorded at the microphone 224. In some embodiments, instructions may be stored at the streaming media driver 227, which may operate to direct operation of the camera 222 or microphone 224.

Figure 3:
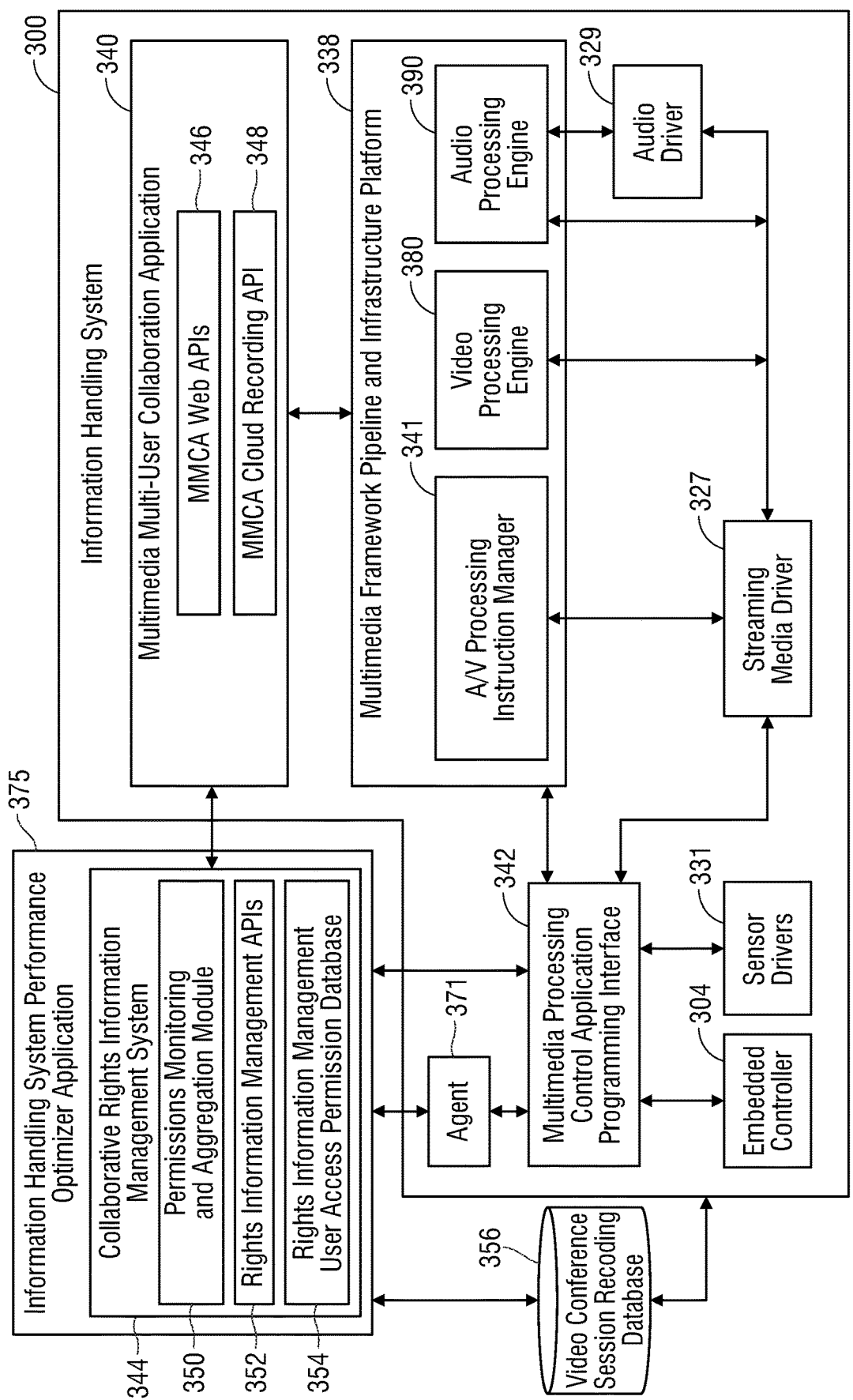
FIG. 3 is a block diagram illustrating a multimedia framework pipeline and infrastructure platform of an information handling system and an operatively-coupled information handling system performance optimizer application according to an embodiment of the present disclosure.

FIG. 3 is a block diagram illustrating an information handling system 300 according to another embodiment of the present disclosure. FIG. 3 shows the interactions between the different hardware, software, and firmware components of the information handling system 300 relative to an information handling system performance optimizer application 375 that includes a collaborative rights information management system 344. The collaborative rights information management system 344 may perform various processes used to record a video conference session, secure access to that video conference session, and, per automatically applied criteria, selectively allow and prevent users to access the recording. In an alternative embodiment, an agent 371 local to the source information handling system 300 can receive instructions to perform various processes used to record a video conference session (e.g., via execution of the MMCA cloud recording API 348), secure access to that video conference session, and, per automatically applied criteria, selectively allow and prevent users to access the recording.

In an embodiment, the collaborative rights information management system 344 may manage the recordation of a video conference session during the execution of the MMCA 340 to create a recording of the video conference session. In an embodiment, the collaborative rights information management system 344 may assign a password to protect the recording of the video conference session at a security level in order to selectively prevent access to the recording by those users or even to those participants of the video conference session who have been identified as having a lower user access permission level than is allowed to view the recording by the video conference session security level. As described in some embodiments herein, some users and participants may be restricted from accessing the recording or segments of the recording even if the participants had and gained access to the video conference in real-time in some embodiments.

The collaborative rights information management system 344 may also, in an embodiment, monitor and aggregate user identification data and access permissions associated with each user accessing the video conference session during the execution of the MMCA 340 with the processor. This may be done by executing the permission monitoring and aggregation module 350 of the collaborative rights information management system 344. The participants who had been invited to participate in the video conference session may have specific access permissions associated with them or other user identification with the access permissions indicating whether the participant is allowed to access a recording or a segment of the recording of the video conference session. In an embodiment, a rights information management API 352 may be executed on behalf of the permission monitoring and aggregation module 350 to retrieve the user identification data to be provided via a number of data sources such as from an email address used to access a hyperlink to the video conference session, an internet protocol (IP) address, a media access control (MAC) address, a phone number associated with the user, a unique password used by the user to access the video conference session, among others. The information handling system 300 and specifically the collaborative rights information management system 344 may include a rights information management user access permission database 354 that includes each participants or user's identification data and associated access permissions of that user. In an embodiment, the rights information management user access permission database 354 may include data descriptive of employees of a company or other enterprise that regularly use the MMCA 340 to engage in video conference sessions with company-internal and company-external users. These access permissions may be set to any scale that places one type of participant or user higher or lower relative to another type of participant or user. For example, in the context of a company organization, and enterprise directory may be accessed and used such that a CEO (e.g., regardless of the person holding that office) may be provided with the highest access permissions while others access permissions may be set at a level comparative to the CEO. Some may be assigned, on the rights information management user access permission database 354, with equal access permissions while others may be assigned lower access permissions. Additionally, in the example where a non-employee of the company is invited to the video conference session, that non-employee will be assigned no access permissions or lower access permissions that may prevent the non-employee form accessing the video conference session recordings.

In an embodiment, the permission monitoring and aggregation module 350 of the collaborative rights information management system 344 may be used to automatically assign a security level to any video conference session recording or a segment of the video conference session recording. In an embodiment, the permission monitoring and aggregation module 350 may monitor for certain security-enhancing stimuli that would increase the security level assigned to the video conference session and, accordingly, the security level assigned to one or more segments of the video conference session recording. In an embodiment, the security-enhancing stimuli may include an indication from the permission monitoring and aggregation module 350 that changes to the aggregated user access permissions associated with each user accessing the video conference session has occurred. In this embodiment, as users or participants engage in the video conference session, some participants may be allowed to participate, but may be prevented from accessing any recordings or prevented from some segments of the recordings made from the video conference session. As such, when these types of participants join, the permission monitoring and aggregation module 350 may determine this to be a security-enhancing stimulus that requires a change to the security levels associated with the video conference session and/or any video conference session recordings produced therefrom.

In an embodiment, the security-enhancing stimuli may include an indication from the permission monitoring and aggregation module 350 that a document is shared during the video conference session. In this embodiment, the collaborative rights information management system 344 may detect text or audio presented during the video conference session to determine that a change to the security levels associated with the video conference session and/or any video conference session recordings should be made. For example, the permission monitoring and aggregation module 350 may conduct an optical character recognition (OCR) process and text parsing algorithm on any document presented or on a videoconference invitation. In this example, if and when the OCR process and text parsing algorithm indicates that certain terms have been used in the document (e.g., "confidential," "eyes only," "private," "secure," "company only", "under non-disclosure" among others), the permission monitoring and aggregation module 350 may determine this to be a security-enhancing stimulus that requires a change to the security levels associated with the video conference session and/or any video conference session recordings produced therefrom. In an embodiment, part of the text recognized by the OCR process and text parsing algorithm may include any title or metadata associated with the content presented by the host of the video conference session. In other embodiments, documents for presentation or other presentation materials may have metadata assigned by a document and secure data management system that indicates the confidentiality of the presentation materials as they are accessed for sharing.

In an embodiment, the security-enhancing stimuli may include an indication of whether a participant is part of an enterprise or company associated with the presentation of the video conference session. For example, a video conference session may be conducted by a specific company and intended to include company employees to participate as participants in the video conference session. As additional participants are added a participant external to the company may be invited and join the video conference session. In this embodiment, the permission monitoring and aggregation module 350 may determine this to be a security-enhancing stimulus that requires a change to the security levels associated with the video conference session and/or any video conference session recordings produced therefrom.

In an embodiment, the security-enhancing stimuli may include an indication from a host of the video conference session that the security level of the video conference session should be increased. In this embodiment, the host of the video conference session may be any participant or organization that initiated the invitations to other participants to attend the video conference session. In an embodiment, the host of the video conference session may be provided with a graphical user interface (GUI) by the collaborative rights information management system 344 to adjust the security level assigned to video conference session recording or segments of the video conference session recording in real-time or after the video conference session has ended. The permission monitoring and aggregation module 350 may determine this adjustment in security level by the host of the video conference session to be a security-enhancing stimulus that requires a change to the security levels associated with the video conference session and/or any video conference session recordings produced therefrom accordingly. The above example aspects of detecting security-enhancing stimuli and providing a designation of security level to a recording or segments thereof may be conducted as a rules based algorithm of the collaborative rights information management system 344.

In another embodiment, the collaborative rights information management system 344 may invoke a trained neural network may be implemented to assign, automatically, a security level to be associated with each video conference session and the resulting video conference session recordings. In this embodiment, a trained neural network may detect the context of the video conference session by using, as input, the security-enhancing stimuli described herein. In this embodiment, the trained neural network may receive data descriptive of the user and participants engaged in the video conference session, their respective security levels assigned to these users, changes to the aggregated user access permissions associated with each user accessing the video conference session, documents being used during a presentation, text or audio presented during the video conference session, indications of whether a participant is part of an enterprise or company associated with the presentation of the video conference session, among other types of data that could affect the security level of the video conference session. As output, the neural network may provide a determination as to the level of security permission to apply to the video conference session and its video conference session recordings. An example neural network may include a multi-layer classifier type neural network or other type of machine learning. These processes are contemplated by the present specification where the collaborative rights information management system 344 may automatically assign a security access level to the video conference session and its video conference session recordings such as look-up tables.

During execution by the processor, the collaborative rights information management system 344 may also monitor each user's sign-in and sign-out times with the user's identification data during the video conference session. In an embodiment, the collaborative rights information management system 344 may execute certain rights information management APIs that interface with the MMCA 340 to retrieve data describing when each participant enters the video conference session ("sign-in") and when each participant exits ("sign-out") the video conference session. This allows the collaborative rights information management system 344 and its permission monitoring and aggregation module 350 to add this data to the access permissions and user identifications as described as well as set security levels of the video conference session recording segments.

The collaborative rights information management system 344, upon execution of the processor, may also determine changes to aggregated user access permissions associated with each user accessing the video conference session to include user identifications of users having lower user access permission level than is allowed to view the recording. During the video conference session, any users may be invited as participants to participate in the video conference session at any time. In some examples, during the video conference session an invite may be sent to a user inviting them to listen to and possibly engage in the remaining portion of the video conference session. As this occurs, the users may be informed that the video conference session is being recorded and the new participant may not provide permission for their AV to be recorded but may otherwise allow for the session to be recorded. Additionally, the user identification data associated with these new participants along with that user's access permissions may not be available or may be set to a level that is insufficient to allow that user to access any recordings or portions of the recording of the video conference session. As described herein, some participants may not provide a permission to record the video conference session. In this embodiment, the collaborative rights information management system 344 may protect all video conference session recordings form these particular participants who did not provide permission for their AV data to be recorded but were otherwise okay with the session to be recorded. In this embodiment, the collaborative rights information management system 344 may increase the security level of the video conference session recordings or segments of the video conference session recordings to prevent these types of participants from accessing these recordings.

When this occurs, and changes to aggregated user access permissions has occurred, the collaborative rights information management system 344 adjust security level assigned to some or all of the video conference session recordings. This may be automated or controlled by a host of the video conference session via the GUI described herein. The collaborative rights information management system 344 may generate a second password to replace the first password or assign encryption or other security measure to protect the recording of the video conference session based on the changes to the aggregated user access permissions associated with each user accessing the video conference session to exclude the user identifications having the lower user access permission level to some or all of the video conference session recording. Because the video conference session is being recorded each user may have been provided with a single password used to access the video conference session as well as to access any recordings made from that video conference session. As such a participant who has an insufficiently low access permission to access the recording may have been provided with that information when logging into the video conference session. Because of the inclusion of this lower user access permission level participant into the video conference session, the collaborative rights information management system 344 may generate a new password (e.g., a second password) in order to protect a segment or all of the recordings from being accessed by this lower user access permission level participant or a participant with access permissions. In an embodiment, a new password may be provided to those participants who did not provide permission for their AV data to be recorded but were otherwise okay with the session to be recorded.

As described herein, shared content during the video conference session may be monitored via execution of the collaborative rights information management system 344 to apply a level of security to the video conference session recording or segments of the video conference session recording. For example, certain word processing documents, presentation documents, spreadsheet documents, images, audio, and videos may, when shared, control whether the security level of the video conference session and their associated recordings should be increased. For example, any text, audio, video, or images may be evaluated by any text, audio, video, or image processing algorithm to determine whether these documents shared include proprietary information that increases the security level of the video conference session. Metadata or other indicators such as recognition of security enhancing stimuli may indicate, as described in embodiments herein, that shared content may require a higher security level to be assigned to the recording or a segment thereof. Additionally, or alternatively, the host of the video conference session may be provided with a graphical user interface (GUI) by the collaborative rights information management system 344 to adjust the security level assigned to video conference session recording or segments of the video conference session recording in real-time or after the video conference session has ended. The permission monitoring and aggregation module 350 may determine this adjustment in security level by the host of the video conference session to be a security-enhancing stimulus that requires a change to the security levels associated with the video conference session and/or any video conference session recordings produced therefrom accordingly.

In an embodiment, the information handling system performance optimizer application 375 may be an application executed remote from the information handling system 300 such that the data received from the execution of the MFPIP 338 is sent to the collaborative rights information management system 344. In an embodiment, the information handling system performance optimizer application 375 may form part of a MMCA not native to the information handling system 300. In an alternative embodiment, the MMCA 340 may be a web-based application operating web APIs 346 that provides the services described herein to multiple users over a network.

The information handling system 300 described with reference to FIG. 3 may represent a transmitting, media source information handling system or a receiving, media sink information handling system in various embodiments. In still other embodiments, information handling system 300 may operate as both a transmitting, media source information handling system and a receiving, media sink information handling system, as may be the case for an information handling system transmitting video of one participant user while simultaneously executing code instructions for the MMCA 340 to display videos of other participants within a shared user session of a video conference system.

The information handling system performance optimizer application 375 in an embodiment may operate remotely from the information handling system 300 in an embodiment. For example, the information handling system performance optimizer application 375 may operate on a server, blade, rack, or cloud-based network maintained and controlled by the manufacturer of several information handling systems, or managed by an employer or enterprise owner of several information handling systems, including information handling system 300. In such an embodiment, the information handling system performance optimizer application 375 may operate to monitor certain performance metrics at each of the plurality of such information handling systems (e.g., including 300), perform firmware and software updates, confirm security credentials and compliance, and manage user access across the plurality of information handling systems (e.g., as owned by an employer or enterprise corporation, and including 300).

The multimedia processing control API 342 in an embodiment may operate, at least in part, as a hub, facilitating communication of video frames and direct media capture instructions and various sensor readings to be provided at the MFPIP 338 for augmentation of the video frames as described herein.

The information handling system 300 in FIG. 3 shows a native MMCA 340 that is executable by a processor of the information handling system 300. Similar to above, the information handling system 300 may be powered on via use of an on switch and a PMU. The PMU may power on an embedded controller 304 that, in an embodiment, executes a basic input/output system (BIOS) and, in an embodiment, an operating system (OS).

In an embodiment, the MFPIP 338 may interface with a number of drivers via streaming media driver 327 of the information handling system as described herein in order to enable an operating system of the information handling system and other computer programs to access the devices used during the execution of the processor of the information handling system. The streaming media driver 327 may be a driver that, when executed by the processor, enables the operating system of the information handling system and other computer programs to distribute the video frames, as adjusted by operation of the MFPIP 338 as described herein. This data stream provided by the streaming media driver 327 may be sent across a network via, for example, a network interface device of the information handling system as described herein.

The streaming media driver 327 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 327. The streaming media driver 327 may be in communication with the AV processing instruction manager 341 via one or more ports (e.g., as described in greater detail with respect to the device proxy of FIG. 4) such that video or audio samples received by the streaming media driver 327 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 327) in an embodiment. In such a way, the AV processing instruction manager 341 may direct retrieval of a video sample captured at a camera operably connected to information handling system and retrieval of an audio sample captured at a microphone operably connected to information handling system.

The audio driver 329 may interface with the operating system and be executed by the processor in order to drive, for example, a specific audio device such as a microphone and an audio card. The audio driver 329 may, in the embodiments herein, interface with an audio processing engine 390 that includes a voice mode effects audio processing object (MFX APO) 391. The driver may allow the MFX APO 391 to interface with the operating system in order to provide audio during the video conference session executed on the MMCA 140. In an embodiment, the MFX APO 391 provides software based digital signal processing for the video conference session. Examples of a MFX APO 391 include graphic equalizers, reverb, tremolo, Acoustic Echo Cancellation (AEC) and Automatic Gain Control (AGC). In an embodiment, the MFX APO 391 may be COM-based, real-time, in-process objects. During execution of the MFX APO 391, a background noise reduction module 392 or any other audio-based AV processing instruction module may be executed to adjust the audio output during the video conference session.

The MFPIP 338 may include a driver stack working with the streaming media driver 327 that operates other drivers such as those associated with peripheral devices of the information handling system. For example, and in the embodiments here, the peripheral devices may include a camera that captures video images and streams those images to the MFPIP as described herein. The driver stack working with the streaming media driver 327 may therefore be a combination of drivers that plug into each other with each of the drivers adding to a chain of drivers that may be executed in serial by the processor. For example, the driver associated with the video camera of the information handling system may be executed prior to any other devices or sensors so that a video frame may first be obtained prior to the data from the sensors being used to, for example, adjust the visual composition of the video frame.

The MFPIP 338 may also include an AV processing instruction manager 341. The AV processing instruction manager 341 may be any processor that coordinates operation of the AV processing with the information handling system performance optimizer application as described herein and cause, for example, one or more AV processing instruction modules to be used to visually and audially transform the one or more video frames and audio samples during the execution of the video conference session. The AV processing instruction manager 341 may interface with a video processing engine 380 to cause, for example, one or more of the AV detection processing instruction modules (381-387) to be executed so as to apply the appropriate visual changes to each video frame according to optimized settings.

Figure 4:
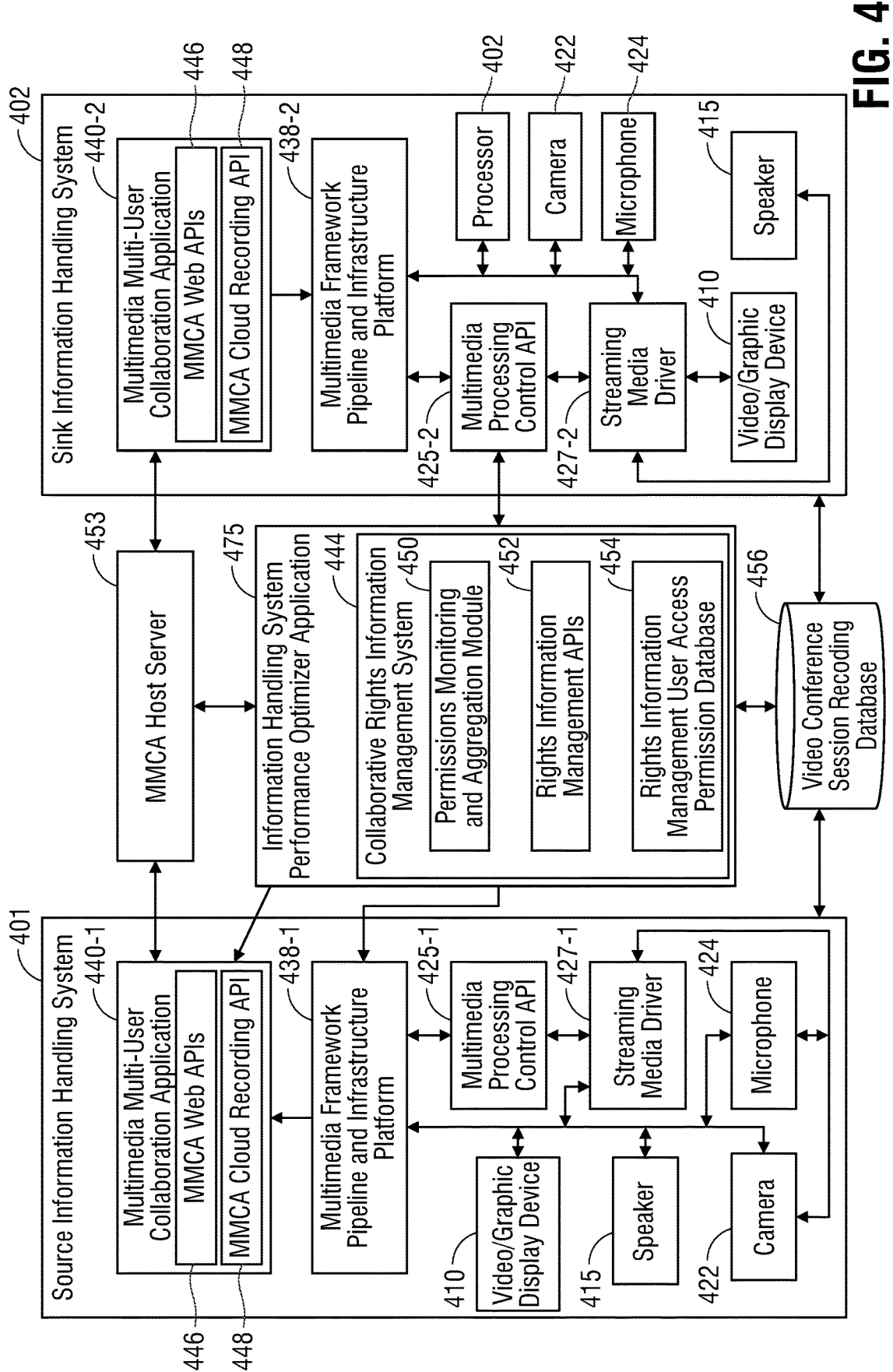
FIG. 4 is a block diagram illustrating a source information handling system and a sink information handling system operatively coupled via a MMCA host server and information handling system performance optimizer application for optimizing information handling system operation of a multimedia, multi-user collaboration application according to an embodiment of the present disclosure.

FIG. 4 is a block diagram illustrating a source information handling system 401 and a sink information handling system 402 operatively coupled via a MMCA host server 435 and information handling system performance optimizer application 475 for optimizing information handling system operation of a MMCA 440-1, 440-2 according to an embodiment of the present disclosure. User sessions may be hosted and coordinated by a MMCA host server 453 located remotely from, but in communication with one or more source information handling systems (e.g., 401) and one or more sink information handling systems (e.g., 402) via a network.

In an embodiment, the operations and processes conducted by the source information handling system 401 may be similar to those of the sink information handling system 402. Because the source information handling system 401 and sink information handling system 402 are engaged in the execution of an MMCA 440-1, 440-2 and participating in a video conference session, each of the source information handling system 401 and sink information handling system 402 are sending and receiving video frames among each other so that each user of the source information handling system 401 and sink information handling system 402 can view and hear, in real-time, the image and sounds produced by the other user. Therefore, the present specifications contemplate that the source information handling system 401 and sink information handling system 402 may perform concurrently those processes of the other at any given time.

As described herein, the source information handling system 401 and sink information handling system 402 each include a MMCA 440-1, 440-2. The MMCA 440-1, 440-2 may be any application that, when executed by the processor 102, initiate or conduct a video conference session between a plurality of users such as between the user of the source information handling system 401 and the sink information handling system 402. With the MMCA 440-1, 440-2 and per the user selections, the MMCA 440-1, 440-2 may present each video frame to the user at a respective video/graphic display device.

The MFPIP 438-1, 438-2 may include audio or video processing systems of the source information handling system 401 or sink information handling system 402 that applies any number of AV detection processing instruction modules to each of the video frames created as the video camera (e.g., webcam) provides those video frames to the video conference session executed by the MMCA 440-1, 440-2. These AV detection processing instruction modules may detect issues related to the visual composition of the video frames which causes the execution of an AV processing instruction module by the MFPIP 438-1, 438-2 to improve that visual composition.

Each of the source information handling system 401 and sink information handling system 402 may include a streaming media driver 427-1, 427-2. As described herein, the streaming media driver 427 in such an embodiment may receive video or audio samples captured by peripheral cameras or microphones in communication therewith, according to default or optimized media capture instructions. In another embodiment, the audio driver may receive audio samples captured by the microphone 424, for example, in communication therewith, according to such received media capture instructions. In such an embodiment, the audio driver may operate as a mini-driver or child device to the parent device streaming media device driver 427-1, 427-2. The streaming media device driver 427-1, 427-2 may be in communication with an AV processing instruction manager via one or more ports (e.g., as described in greater detail with respect to the of FIG. 4) such that video or audio samples received by the streaming media device driver 427-1, 427-2 may be transmitted to an AV processing instruction manager, in an embodiment. The audio driver may be in communication with the AV processing instruction manager such that audio samples received by the audio driver may be transmitted to the AV processing instruction manager (e.g., via the audio processing engine, or via the streaming media driver, for example) in an embodiment. In such a way, the AV processing instruction manager may direct retrieval of a video sample captured at a camera operably connected to information handling system and retrieval of an audio sample captured at a microphone 424 operably connected to information handling system 402.

The source information handling system 401 and sink information handling system 402 may further includes a MPCAPI 425-1, 425-2. The MPCAPI 425-1, 425-2 in an embodiment may operate to facilitate communication between various applications, controllers, and drivers of the information handling system in an embodiment. For example, the MPCAPI 425-1, 425-2 may interface between a MFPIP 438-1, 438-2 and the sensors of the sensor array such as the camera.

In the embodiment, the source information handling system 401, as well as the sink information handling system 402, may include a microphone 424 used to receive sounds from the user and, with the audio driver or streaming media driver 427-2 and other audio processing devices, create audio used to accompany the video output by the MMCA 440-1, 440-2. The source information handling system 401, as well as the sink information handling system 402, may include a camera 422 used to capture images of the users while engaged with the video conference session executed by the MMCA 440-1, 440-2. Still further, the source information handling system 401, as well as the sink information handling system 402, may include a speaker 415 to produce audio output and a video/graphics display device 410 to produce video output to the participants of the video conference session.

FIG. 4 shows the interactions between the different hardware, software, and firmware components of the source information handling system 401 and sink information handling system 402 relative to an information handling system performance optimizer application 475.

During operation of the source or sink information handling systems 401, 402, the MMCA 440-1, 440-2 may be executed. During operation of the information handling systems 401, 402, their respective processors may interface with a collaborative rights information management system 444. The collaborative rights information management system 444 may perform various processes used to record a video conference session, secure access to that video conference session, and, per automatically applied criteria, selectively allow and prevent users to access the recording.

In an embodiment, the collaborative rights information management system 444 may manage the recordation of a video conference session during the execution of the MMCA 440-1, 440-2 to create a recording of the video conference session. In an embodiment, the collaborative rights information management system 444 may designate a security level to some or all of the video conference session recordings and assign a password to protect the recording of the video conference session in order to selectively prevent access to the recording by those users or even to those participants of the video conference session who have been identified as having a lower user access permission level than is allowed to view the recording or segment thereof. As described herein, some users and participants may be restricted from accessing the recording or segments of the recording even if the participants had and gained access to the video conference in real-time.

The collaborative rights information management system 444 may also, in an embodiment, monitor and aggregate user identification data and access permissions associated with each user accessing the video conference session during the execution of the MMCA 440 with the respective processors. This may be done by executing the permission monitoring and aggregation module 450 of the collaborative rights information management system 444. The participants who had been invited to participate in the video conference session may have specific access permissions associated with them or other user identification with the access permissions indicating whether the participant is allowed to access a recording or a segment of the recording of the video conference session. In an embodiment, a rights information management API 452 may be executed on behalf of the permission monitoring and aggregation module 450 to retrieve the user identification data to be provided via a number of data sources such as from an email address used to access a hyperlink to the video conference session, an internet protocol (IP) address, a media access control (MAC) address, a phone number associated with the user, a unique password used by the user to access the video conference session, among others. The collaborative rights information management system 444 may include a rights information management user access permission database 454 that includes each participants or user's identification data and associated access permissions of that user. In an embodiment, the rights information management user access permission database 454 may include data descriptive of employees of a company or other enterprise that regularly use the MMCA 440-1, 440-2 to engage in video conference sessions with company-internal and company-external users. These access permissions may be set to any scale that places one type of participant or user higher or lower relative to another type of participant or user. Again, in an example and in the context of a company organization, and enterprise directory may be accessed and used such that a CEO (e.g., regardless of the person holding that office) may be provided with the highest access permissions while others access permissions may be set at a level comparative to the CEO. Some may be assigned, on the rights information management user access permission database 454, with equal access permissions while others may be assigned lower access permissions. Additionally, in the example where a non-employee of the company is invited to the video conference session, that non-employee will be assigned no access permissions or lower access permissions that may prevent the non-employee form accessing the video conference session recordings.

In an embodiment, the permission monitoring and aggregation module 450 of the collaborative rights information management system 444 may be used to automatically assign a security level to any video conference session recording or a segment of the video conference session recording. In an embodiment, the permission monitoring and aggregation module 450 may monitor for certain security-enhancing stimuli that would increase the security level assigned to the video conference session and, accordingly, the security level assigned to one or more segments of the video conference session recording. In an embodiment, the security-enhancing stimuli may include an indication from the permission monitoring and aggregation module 450 that changes to the aggregated user access permissions associated with each user accessing the video conference session has occurred. In this embodiment, as users or participants engage in the video conference session, some participants may be allowed to participate but may be prevented to access any recordings or some segments of the recordings made from the video conference session. As such, when these types of participants join, the permission monitoring and aggregation module 450 may determine this to be a security-enhancing stimulus that requires a change to the security levels associated with the video conference session and/or any video conference session recordings produced therefrom. For example, user identification information as described herein may be utilized to indicate a level of a user within an organization or an affiliation of a user with one or more organizations which may provide context for a security-enhancing stimuli.

In an embodiment, the security-enhancing stimuli may include an indication from the permission monitoring and aggregation module 450 that a document is shared during the video conference session. In this embodiment, the collaborative rights information management system 444 may detect text or audio presented during the video conference session to determine that a change to the security levels associated with the video conference session and/or any video conference session recordings should be made. For example, the permission monitoring and aggregation module 350 may conduct an optical character recognition (OCR) process and text parsing algorithm on any document presented or on a videoconference invitation. In this example, if and when the OCR process and text parsing algorithm indicates that certain terms have been used in the document (e.g., "confidential," "eyes only," "private," "secure," "company only", "under non-disclosure" among others), the permission monitoring and aggregation module 350 may determine this to be a security-enhancing stimulus that requires a change to the security levels associated with the video conference session and/or any video conference session recordings produced therefrom. In an embodiment, part of the text recognized by the OCR process and text parsing algorithm may include any title or metadata associated with the content presented by the host of the video conference session. In other embodiments, documents for presentation or other presentation materials may have metadata assigned by a document and secure data management system that indicates the confidentiality of the presentation materials as they are accessed for sharing.

In an embodiment, the security-enhancing stimuli may include an indication of whether a participant is part of an enterprise or company associated with the presentation of the video conference session. For example, a video conference session may be conducted by a specific company and intended to include company employees to participate as participants in the video conference session. As additional participants are added a participant external to the company may be invited and join the video conference session. Various forms of user identification information, as described in embodiments herein, may be utilized to indicate a level of a user within an organization or an affiliation of a user with one or more organizations which may provide context for a security-enhancing stimuli. In this embodiment, the permission monitoring and aggregation module 450 may determine this to be a security-enhancing stimulus that requires a change to the security levels associated with the video conference session and/or any video conference session recordings produced therefrom.

In an embodiment, the security-enhancing stimuli may include an indication from a host of the video conference session that the security level of the video conference session should be increased. In this embodiment, the host of the video conference session may be any participant or organization that initiated the invitations to other participants to attend the video conference session. In an embodiment, the host of the video conference session may be provided with a graphical user interface (GUI) by the collaborative rights information management system 444 to adjust the security level assigned to video conference session recording or segments of the video conference session recording in real-time or after the video conference session has ended. The permission monitoring and aggregation module 450 may determine this adjustment in security level by the host of the video conference session to be a security-enhancing stimulus that requires a change to the security levels associated with the video conference session and/or any video conference session recordings produced therefrom accordingly.

During execution by the processor, the collaborative rights information management system 444 may also monitor each user's sign-in and sign-out times at the MMCA host server 453 with the user's identification data during the video conference session. In an embodiment, the collaborative rights information management system 444 may execute certain rights information management APIs that interface with the MMCA 440-1, 440-2 to retrieve data describing when each participant enters the video conference session ("sign-in") and when each participant exits ("sign-out") the video conference session. This allows the collaborative rights information management system 444 and its permission monitoring and aggregation module 450 to add this data to the access permissions and user identifications as described as well as set security levels of the video conference session recording segments.

The collaborative rights information management system 444, upon execution of a processor, may also determine changes to aggregated user access permissions associated with each user accessing the video conference session to include user identifications of users having lower user access permission level than is allowed to view the recording. During the video conference session, any users may be invited as participants to participate in the video conference session at any time. In some examples, during the video conference session an invite may be sent to a user inviting them to listen to and possibly engage in the remaining portion of the video conference session. As this occurs, the users may be informed that the video conference session is being recorded and the new participant may not provide permission for their AV to be recorded but may otherwise allow for the session to be recorded. Additionally, the user identification data associated with these new participants along with that user's access permissions may not be available or may be set to a level that is insufficient to allow that user to access any recordings or portions of the recording of the video conference session. As described herein, some participants may not provide a permission to record the video conference session. In this embodiment, the collaborative rights information management system 444 may protect all video conference session recordings form these particular participants who did not provide permission for their AV data to be recorded but were otherwise okay with the session to be recorded. In this embodiment, the collaborative rights information management system 444 may increase the security level of the video conference session recordings or segments of the video conference session recordings to prevent these types of participants from accessing these recordings.

When this occurs, and changes to aggregated user access permissions has occurred, the collaborative rights information management system 444 adjust security level assigned to some or all of the video conference session recordings. This may be automated or controlled by a host of the video conference session via the GUI described herein. The collaborative rights information management system 444 may generate a second password to replace the first password to protect the recording of the video conference session based on the changes to the aggregated user access permissions associated with each user accessing the video conference session to exclude the user identifications having the lower user access permission level to some or all of the video conference session recording. Because the video conference session is being recorded each user may have been provided with a single password used to access the video conference session as well as to access any recordings made from that video conference session. As such a participant who has an insufficiently low access permission to access the recording may have been provided with that information when logging into the video conference session. Because of the inclusion of this lower user access permission level participant into the video conference session, the collaborative rights information management system 444 may generate a new password (e.g., a second password) in order to protect a segment or all of the recordings from being accessed by this lower user access permission level participant or a participant with access permissions. In an embodiment, a new password may be provided to those participants who did not provide permission for their AV data to be recorded but were otherwise okay with the session to be recorded.

As described herein, shared content during the video conference session may be monitored via execution of the collaborative rights information management system 444 to apply a level of security to the video conference session recording or segments of the video conference session recording. For example, certain word processing documents, presentation documents, spreadsheet documents, images, audio, and videos may, when shared, control whether the security level of the video conference session and their associated recordings should be increased. For example, any text, audio, video, or images may be evaluated by any text, audio, video, or image processing algorithm to determine whether these documents shared include proprietary information that increases the security level of the video conference session. Additionally, or alternatively, the host of the video conference session may be provided with a graphical user interface (GUI) by the collaborative rights information management system 444 to adjust the security level assigned to video conference session recording or segments of the video conference session recording in real-time or after the video conference session has ended. The permission monitoring and aggregation module 450 may determine this adjustment in security level by the host of the video conference session to be a security-enhancing stimulus that requires a change to the security levels associated with the video conference session and/or any video conference session recordings produced therefrom accordingly.

The MMCA host server 453, during operation, may then permit access, via the network interface device, to the recordings of the video conference session by transmitting the second password to those user identifications of users who are associated with a higher user access permission level than the aggregated user access permissions and are authorized to access the recording. This secures the recordings of the video conference session so that they may not be accessed by those who are not allowed.

In an embodiment, the collaborative rights information management system 444 may separate the recording of the video conference session into a plurality of AV video conference segment session files based on each user's sign-in and sign-out times during the video conference session. In this embodiment, those participants or users that have lower user access permission levels to access some segments of the video conference session may otherwise have sufficient user access permission levels to access other segments. In this embodiment, the collaborative rights information management system, via the network interface device, may transmit the second password for accessing the whole recording when a first AV video conference segment session file required the user with higher access permission level is present while providing for the lower user access permission level participants to access other segments using the first password or another alternative password that provides access to only those segments of the video conference session that their respective user access permission levels allow. By segmenting the recordings of the video conference session into a plurality of AV video conference segment session files, any data that is to remain confidential may remain so while those discussion and interactions on the video conference session that are not particularly confidential may be shared with others who meet the requisite user access permission levels.

In an embodiment, the collaborative rights information management system may separate the recording of the video conference session into a plurality of AV video conference segment session files based on each user's sign-in and sign-out times during the video conference session, but, in this embodiment, the collaborative rights information management system 444 may also assign different security levels to the plurality of AV video conference segment session files and include the plurality of AV video conference session files in the same video container. This may allow each user with access permission levels meeting the security levels of the AV video conference segment session files to access the plurality of AV video conference segment session files. In this manner the collaborative rights information management system 444 may cause the recorded video conference sessions, regardless of how they are segmented, in the same video container and stored on a video conferencing session recording database 456 accordingly.

In an embodiment, as each user engages with and participates in the video conference session, their user identification data and associated user access permissions may be stored on a rights information management user access permission database 454 as described herein. Thus, although a particular company may maintain such a database that includes all of their employees' data used to access the recordings of the video conference session, this rights information management user access permission database 454 may be continually updated as new participants in any video conference session are introduced. In some instances, a manager of the collaborative rights information management system 444 may manually alter the user access permission levels of any given participant after any video conference session via the GUI indicating that their user access permission level has changed to allow more (or less) access to more recordings of the video conference session or segments thereof.

As described herein, the information handling systems 401, 402 may include or have access to a video conferencing session recording database 456. Additionally, each information handling system engaged in the video conference session may also be provided access to the video conferencing session recording database 456 as described herein and based on the user access permission levels. In an embodiment, the participants and other users may gain access to video conference session recordings or segments thereof upon confirmation from the collaborative rights information management system 444 that each user or participant has appropriate user access permission levels to gain such access based on a security level designated to some or all of the video conference session recordings.

Figure 5:
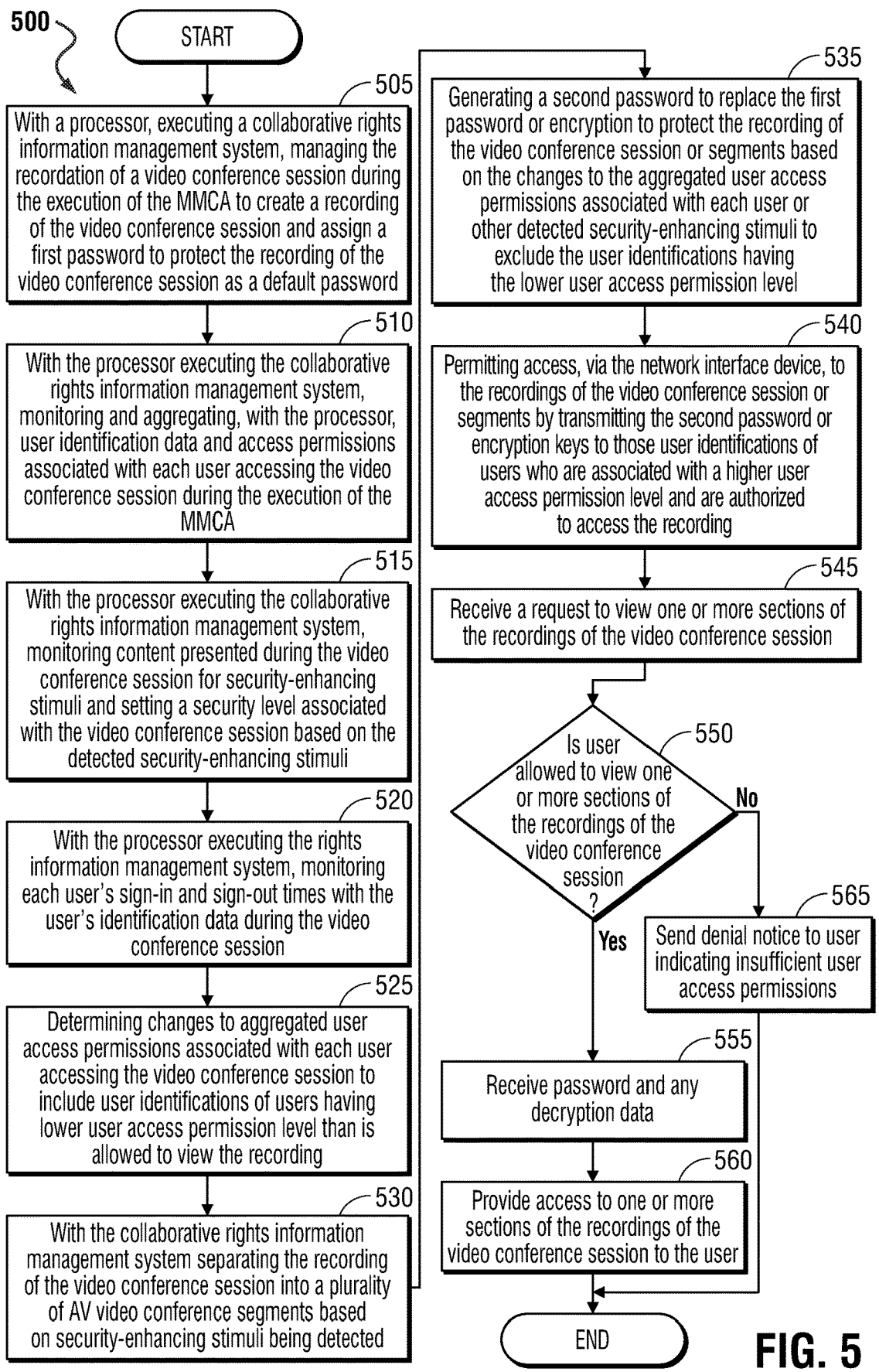
FIG. 5 is a flow diagram illustrating a method of secure management of recordings of a video conference session according to an embodiment of the present disclosure.

FIG. 5 is a flow diagram illustrating method 500 of managing recordings during a video conference session according to an embodiment of the present disclosure. The method described in connection with FIG. 5 may be conducted by a host server information handling system that executes a multimedia multi-user collaboration application (MMCA) on behalf of a number of network information handling systems sometimes called client devices, for example. Alternatively, other information handling systems may be used to conduct the method described herein and the present specification contemplates the use of these other types of information handling systems described herein.

The method 500 may begin, at block 505, with executing a collaborative rights information management system for managing the recordation of a video conference session during the execution of the MMCA. The MMCA host server may create a recording of the video conference session and assign a first password to protect the recording of the video conference session as a default password with a processor. As described herein, a host server operating a MMCA may conduct or organize the procurement of these recordings during the execution of the MMCA or, alternatively, a specific information handling system may conduct or organize the procurement of these recordings during the execution of the MMCA. This may be done via execution of an MMCA Cloud Recording API by the MMCA so that a recording may be capture and stored in a video conference session recording database.

The method 500, at block 510, may continue with monitoring and aggregating, with the processor, user identification data and access permissions associated with each user accessing the video conference session during the execution of the MMCA with the processor executing the collaborative rights information management system. This may be done by executing the permission monitoring and aggregation module of the collaborative rights information management system. The permission monitoring and aggregation module may determine a list of participants or invitees to the video conference session from an MMCA host server as well as user identification data of those participants or invitees. The participants who had been invited to participate in the video conference session may have specific access permissions associated with them or other user identification associated with the access permissions. The access permissions of participants determine whether the participant is allowed to access a recording or a segment of the recording of the video conference session have a security level designation met or exceeded by the participant's access permissions. In an embodiment, a rights information management API may be executed on behalf of the permission monitoring and aggregation module to retrieve the user identification data of a participant or other user seeking access. This user identification data may be returned from a number of data sources such as from an email address used to access a hyperlink to the video conference session, an internet protocol (IP) address, a media access control (MAC) address, a phone number associated with the user, a unique password used by the user to access the video conference session, among others. The information handling system and specifically the collaborative rights information management system may include a rights information management user access permission database that includes each participants or user's identification data and associated access permissions of that user. In an embodiment, the rights information management user access permission database may include data descriptive of employees of a company or other enterprise that regularly use the MMCA to engage in video conference sessions with company-internal and company-external users. These access permissions may be set to any scale that places one type of participant or user higher or lower relative to another type of participant or user. For example, the context of user identification data may be determined from a company organization, and enterprise directory that may be accessed. Such a hierarchy may be used in one example embodiment such that a CEO (e.g., regardless of the person holding that office) may be provided with the highest access permissions while others access permissions may be set at a level comparative to the CEO. Some may be assigned, on the rights information management user access permission database, with equal access permissions while others may be assigned lower access permissions. Multiple levels of access permissions are contemplated in various embodiments. Additionally, in the example where a non-employee of the company is invited to the video conference session, that non-employee will be assigned no access permissions or lower access permissions prevent the non-employee from accessing the video conference session recordings in an embodiment where control over information discussed or documents or presentations shared are to be kept internal to the company, for example.

The method 500 may continue at block 515 with monitoring content presented during the video conference session for security-enhancing stimuli and setting a security level associated with the video conference session based on the detected security-enhancing stimuli via execution of the collaborative rights information management system by the processor. As described herein, the permission monitoring and aggregation module of the collaborative rights information management system may be used to automatically assign a security level to any video conference session recording or a segment of the video conference session recording. In an embodiment, the permission monitoring and aggregation module may monitor for certain security-enhancing stimuli that would increase the security level assigned to the video conference session and, accordingly, the security level assigned to one or more segments of the video conference session recording. In an embodiment, the security-enhancing stimuli may include an indication from the permission monitoring and aggregation module that changes to the aggregated user access permissions associated with each user accessing the video conference session has occurred. In this embodiment, as users or participants engage in the video conference session, some participants may be allowed to participate but may be prevented to access any recordings or some segments of the recordings made from the video conference session. As such, when these types of participants join, the permission monitoring and aggregation module may determine this to be a security-enhancing stimulus that requires a change to the security levels associated with the video conference session and/or any video conference session recordings produced therefrom.

In an embodiment, the security-enhancing stimuli may include an indication from the permission monitoring and aggregation module that a document is shared during the video conference session. In this embodiment, the collaborative rights information management system 44 may detect text or audio presented during the video conference session to determine that a change to the security levels associated with the video conference session and/or any video conference session recordings should be made. For example, the permission monitoring and aggregation module may access a document and secure data management system that assigns metadata to documents and materials that indicates the confidentiality assigned of the presentation materials and managed by a central information technology group. The permission monitoring and aggregation module may identify such metadata as a document or other data is accessed for sharing in a videoconference. In another example, the permission monitoring and aggregation module 350 may conduct an optical character recognition (OCR) process and text parsing algorithm on any document presented or on a videoconference invitation. In this example, if and when the OCR process and text parsing algorithm indicates that certain terms have been used in the document (e.g., "confidential," "eyes only," "private," "secure," "company only", "under non-disclosure" among others), the permission monitoring and aggregation module 350 may determine this to be a security-enhancing stimulus that requires a change to the security levels associated with the video conference session and/or any video conference session recordings produced therefrom. In an embodiment, part of the text recognized by the OCR process and text parsing algorithm may include any title or metadata associated with the content presented by the host of the video conference session.

In an embodiment, the security-enhancing stimuli may include an indication of whether a participant is part of an enterprise or company associated with the presentation of the video conference session. For example, a video conference session may be conducted by a specific company and intended to include company employees to participate as participants in the video conference session. As additional participants are added a participant external to the company may be invited and join the video conference session. For example, user identification information as described herein may be utilized to indicate a level of a user within an organization or an affiliation of a user with one or more organizations which may provide context for a security-enhancing stimuli. In this embodiment, the permission monitoring and aggregation module may determine this to be a security-enhancing stimulus that requires a change to the security levels associated with the video conference session and/or any video conference session recordings produced therefrom.

In an embodiment, the security-enhancing stimuli may include an indication from a host of the video conference session that the security level of the video conference session should be increased. In this embodiment, the host of the video conference session may be any participant or organization that initiated the invitations to other participants to attend the video conference session. In an embodiment, the host of the video conference session may be provided with a graphical user interface (GUI) by the collaborative rights information management system to adjust the security level assigned to video conference session recording or segments of the video conference session recording in real-time or after the video conference session has ended. The permission monitoring and aggregation module may determine this adjustment in security level by the host of the video conference session to be a security-enhancing stimulus that requires a change to the security levels associated with the video conference session and/or any video conference session recordings produced therefrom accordingly.

The method 500 may continue at block 520 with monitoring each user's sign-in and sign-out times with the user's identification data during the video conference session via execution of the processor executing the rights information management system by a processor. In an embodiment, the collaborative rights information management system may execute certain rights information management APIs that interface with the MMCA to retrieve data describing when each participant enters the video conference session ("sign-in") and when each participant exits ("sign-out") the video conference session. This allows the collaborative rights information management system and its permission monitoring and aggregation module to add this data to the access permissions and user identifications as described.

Having obtained the user's sign-in and sign-out times with the user's identification data, the method 500 may continue at block 525 with determining changes to aggregated user access permissions associated with each user accessing the video conference session to include user identifications of users having lower user access permission level than is allowed to view the recording. During the video conference session, any users may be invited as participants to participate in the video conference session at any time. In some examples, during the video conference session an invite may be sent to a user inviting them to listen to and possibly engage in the remaining portion of the video conference session. As this occurs, the users may be informed that the video conference session is being recorded and the new participant may not provide permission for their AV to be recorded but may otherwise allow for the session to be recorded. Additionally, the user identification data associated with these new participants along with that user's access permissions may not be available or may be set to a level that is insufficient to allow that user to access any recordings or portions of the recording of the video conference session.

The method 500 may continue at block 530 with separating or segmenting the recording of the video conference session into a plurality of AV video conference segment session files based on security-enhancing stimuli being detected via execution of the collaborative rights information management system by the processor. As described herein, this separation or segmentation of the recording of the video conference session may depend on a number of factors including which participants attended the video conference session (from what organizations or levels of enterprise hierarchy), when these participants signed onto the video conference session, what topics were discussed and when these topics were discussed during the video conference session from context of the invitation or communications prior among participants, what and when documents or images were shared during the video conference session, the security level permissions and identifications associated with each of these participants, as well as any designations of security level changes initiated by the host of the video conference session as described in various embodiments herein.

The method may further include, at block 535, generating a second password to replace the first password to protect the recording of the video conference session based on the changes to the aggregated user access permissions associated with each user accessing the video conference session to exclude the user identifications having the lower user access permission level. Because the video conference session is being recorded each user may have been provided with a single password used to access the video conference session as well as to access any recordings made from that video conference session. As such a participant who has an insufficiently low access permission to access the recording may have been provided with that information when logging into the video conference session. Because of the inclusion of this lower user access permission level participant into the video conference session, the collaborative rights information management system 144 may generate a new password (e.g., a second password) in order to protect the recordings from being accessed by this lower user access permission level participant. In an embodiment where a user was not a participant during the video conference session, this second password or other encryption data keys may be sent to the user or otherwise provided to that user upon request when the collaborative rights information management system has determined that that user is authorized to view the video conference session recordings or segments thereof.

In an embodiment, certain video conference session recordings and segments of the video conference session recordings may be encrypted to increase the security of those recordings. In these embodiments, a description key may be provided to those users or participants who have been determined by the execution of the collaborative rights information management system to have sufficient security levels to view the recordings. These decryption keys may be provided upon request or automatically to these participants, via, for example, a text message, an email or any other communication method. In an embodiment, those passwords and decryption keys associated with specific segments of the video conference session recording may be sent, where applicable, based on the user's or participant's security level and authorization to view those segments.

The method 500 may then proceed to block 540 with permitting access, via the network interface device, to the recordings of the video conference session or some segments thereof by transmitting the second password and decryption keys to those user identifications of users who are associated with a higher user access permission level than the aggregated user access permissions and are authorized to access the recording. This secures the recordings of the video conference session or segments thereof at a video conference session recording database so that they may not be accessed by those who are not allowed.

In an embodiment, the collaborative rights information management system may separate the recording of the video conference session into a plurality of AV video conference segment session files based on each user's sign-in and sign-out times (e.g., block 515) during the video conference session or content discussed or shared during portions of the video conference session. In this embodiment, those participants or users that have lower user access permission levels to access some segments of the video conference session having a lower designated security level may otherwise have insufficient user access permission levels to access other segments having a higher designated security level. In this embodiment, the collaborative rights information management system, via the network interface device, may transmit the second password and decryption key for accessing the whole recording when a first AV video conference segment session file required the user with higher access permission level is present while providing for the lower user access permission level participants to access other segments using the first password or another alternative password that provides access to only those segments of the video conference session that their respective user access permission levels allow. By segmenting the recordings of the video conference session into a plurality of AV video conference segment session files, any data that is to remain confidential may remain so while those discussion and interactions on the video conference session that are not particularly confidential may be shared with others who meet the requisite user access permission levels.

In another embodiment, the collaborative rights information management system may separate the recording of the video conference session into a plurality of AV video conference segment session files based on each user's sign-in and sign-out times, sensitivity of content discussed or shared, or a host description, via the GUI, during the video conference session as described herein. In this embodiment, the collaborative rights information management system may also assign different security levels to the plurality of AV video conference segment session files and include the plurality of AV video conference session files with varying encryption for multiple different segments in the same video container allowing each user with access permission levels meeting the security levels of the AV video conference segment session files to access the plurality of AV video conference segment session files with corresponding decryption keys. In this manner the collaborative rights information management system may cause the recorded video conference sessions, regardless of how they are segmented, in the same video container and stored on the video conferencing session recording database accordingly.

In an embodiment, as each user engages with and participates in the video conference session, their user identification data and associated user access permissions may be stored on a rights information management user access permission database as described herein. Thus, although a particular company may maintain such a databased that includes all of their employees' data used to access the recordings of the video conference session, this rights information management user access permission database may be continually updated as new participants in any video conference session are introduced. In some instances, a manager of the collaborative rights information management system may manually alter the user access permission levels of any given participant after any video conference session indicating that their user access permission level has changed to allow more access to more recordings of the video conference session or segments thereof.

The method 500 may also include, at block 545, with receiving a request to view one or more sections of the recordings of the video conference session. This request may be conducted by a user by, for example, accessing a notice from the collaborative rights information management system that includes instructions or links to access the recordings. In an embodiment, a determination may be made at block 550 by, for example, the collaborative rights information management system as to whether the user is allowed or authorized to view one or more sections of the recordings of the video conference session. The collaborative rights information management system may access a rights information management user access permission database to determine if a user's identification data includes any associated user access permission level. If the user is allowed to view the recordings, the method 500 proceeds to block 555 with the collaborative rights information management system receiving an authorized password and any necessary decryption key that accompanies the notice from the collaborative rights information management system. The collaborative rights information management system may then provide access, at block 560, to one or more sections of the recording of the video conference session to the user. The collaborative rights information management system may call the appropriate sections of the recording of the video conferencing session at the video conferencing session recording database.

Where the user is not allowed to view one or more sections of the recordings of the video conference session at block 550, the method 500 may continue at block 565 with sending a denial notice to the user indicating insufficient user access permissions. This secures the recordings so that only authorized users and participants may access the recordings. At this point the method 500 may end.

Figure 6:
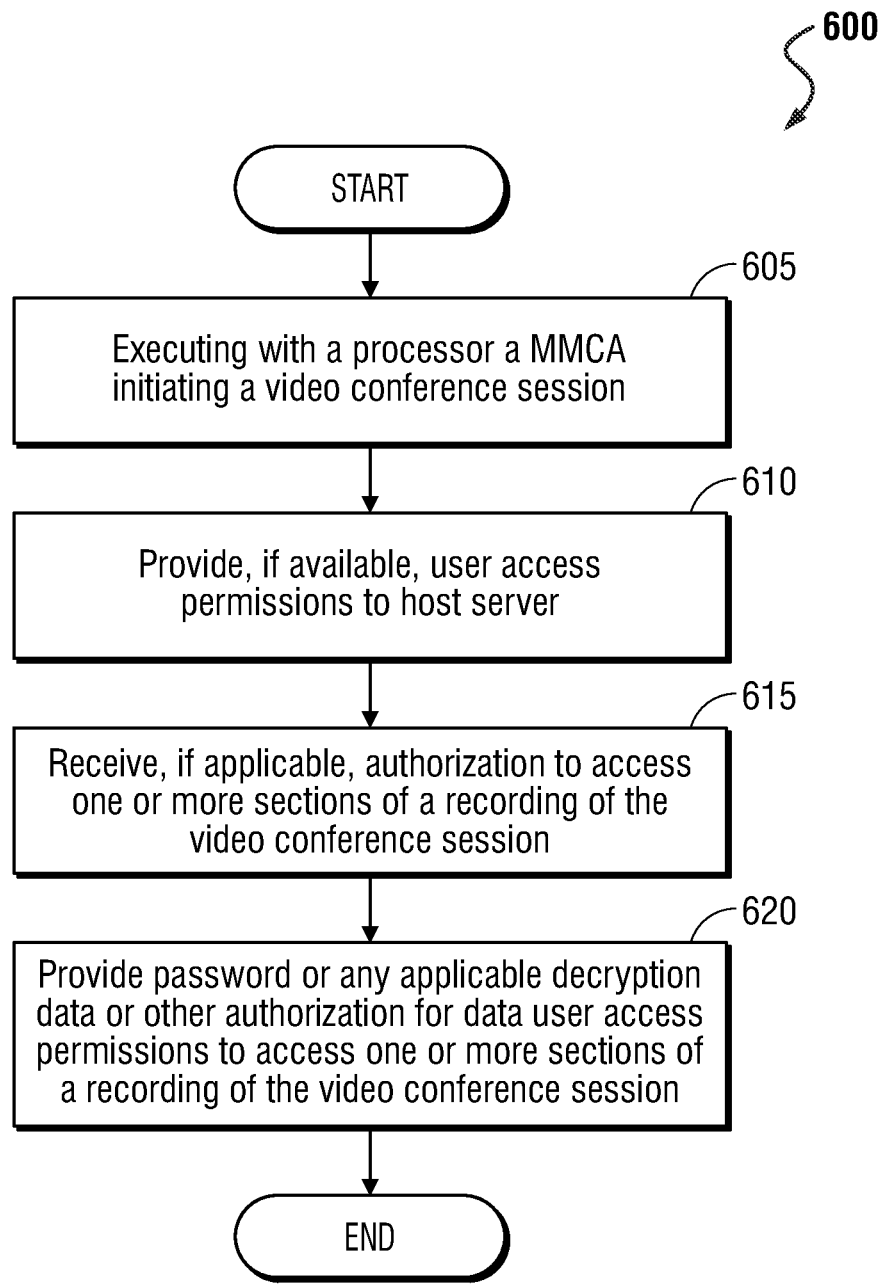
FIG. 6 is a flow diagram illustrating a method of secure management of recordings of a video conference session according to another embodiment of the present disclosure.

FIG. 6 is a flow diagram illustrating a method of managing recordings during a video conference session according to an embodiment of the present disclosure. The method 600 may be conducted by a source or sink information handling system, for example, that produces AV data for transmission to other information handling systems during execution of a MMCA as described herein. The method may be conducted by a user in order to gain access to a recording of a video conference session the user participated in.

The method 600 may include executing, with a processor, a MMCA initiating a video conference session at block 605. The MMCA may be any application that, when executed by the processor, initiate a video conference session between a plurality of users such as between the user of the information handling system and another remote user of another information handling system. MMCA may utilize an MMCA central facility server, such as the information handling system in an embodiment, to engage in the video conference. With the MFPIP and MPCAPI and per the operations of the collaborative rights information management system described herein, the MMCA may cause video frames to be transmitted to the MFPIP for processing, reprocessing, encoding, decoding, capture, and display (e.g., via bus) and present each video frame to the user at the video/graphic display device. In an embodiment, a user may sign-in to the video conference session executed by the MMCA using, for example, a default password. At this time, the user identification information may be sent to the MCA host server for evaluation by the collaborative rights information management system as described herein. This sign-in to the video conference session also creates a "sign-in" event notification at the collaborative rights information management system for use by the collaborative rights information management system as described herein.

The method 600 may then include, at block 610, providing, if available, user access permissions to a host server such as the information handling system based on user identification data such as from a sign-in process described in connection with FIG. 1. As described herein, user access permissions may be assigned to a user based on status in an organization, prior interactions in a video conference session, or by default upon an initial interaction with the video conference session. In an embodiment, a rights information management user access permission database may include data descriptive of these user access permissions. In a specific embodiment, employees of a company or other enterprise that regularly use the MMCA to engage in video conference sessions with company-internal and company-external users. These access permissions may be set to any scale that places one type of participant or user higher or lower relative to another type of participant or user. For example, in the context of a company organization, and enterprise directory may be accessed and used such that a CEO (e.g., regardless of the person holding that office) may be provided with the highest access permissions while others access permissions may be set at a level comparative to the CEO. Some may be assigned, on the rights information management user access permission database, with equal access permissions while others may be assigned lower access permissions. Additionally, in the example where a non-employee of the company is invited to the video conference session, that non-employee will be assigned no access permissions or lower access permissions that may prevent the non-employee form accessing the video conference session recordings.

The method 600 may include, at block 615, receiving, if applicable, authorization to access one or more sections of a recording of the video conference session. Again, where the user has permission to access the recordings, authorization may be provided to the user upon such a determination by the collaborative rights information management system. In an embodiment, the collaborative rights information management system may include a rights information management user access permission database that includes each participants or user's identification data and associated access permissions of that user. In an embodiment, as each user engages with and participates in the video conference session, their user identification data and associated user access permissions may be matched together at the rights information management user access permission database as described herein to determine their respective user access permissions.

The method 600 may further include, at block 620, providing a password and any application decryption data or other authorization for user access permissions to access one or more sections of a recording of the video conference session. In addition to providing the access permissions associated with the user's identification data, a password, and a decryption key, where applicable, may be received from the collaborative rights information management system that allows for access to the recordings as described herein. In an example, the password, and a decryption key, where applicable, may be provided to the user via an email or other communication method automatically to the user upon completion of the video conference session in an example. In an embodiment, the video conference session recordings or segments thereof may be accessed by inputting a password. For example, a user may receive an email indicating that a recording of the video conference session or segment thereof is available to review. The user may click on a hyperlink or gain access to the video conferencing session recording database over the internet. In the case of actuation, the hyperlink, the password may be automatically populated into a login screen presented to the user. Additionally, a decryption key may be provided that allows the user's information handling system to decrypt the encrypted video conference session recordings or applicable segments of the video conference session recordings. Once accessed, the video conference session recordings or segments may be played on a video/graphics display device of the information handling system with any accompanying audio played at one or more speakers. At this point, the method 600 may end.

The blocks of the flow diagrams of FIGS. 5 and 6, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A host server information handling system executing a multimedia multi-user collaboration application (MMCA), comprising:
   a processor;
   a memory;
   a power management unit;
   a network interface device to receive and provide audio/visual (AV) data during execution of the MMCA for a video conference session;
   the processor configured to execute a collaborative rights information management system to:
      manage a recording of the video conference session during the execution of the MMCA to create the recording of the video conference session and assign a first password to protect the recording of the video conference session as a default password;

monitor and aggregate user identification data and access permissions associated with each user accessing the video conference session during the execution of the MMCA;

monitor each user's sign-in and sign-out times with the user's identification data during the video conference session;

determine changes to aggregated user access permissions associated with each user accessing the video conference session to include user identifications of users having lower user access permission level than is allowed to view the recording;

assign a security level to the recording of the video conference session;

generate a second password to replace the first password to protect the recording of the video conference session based on the changes to the aggregated user access permissions associated with each user accessing the video conference session to exclude the user identifications of users having the lower user access permission level; and permit access, via the network interface device, to the recordings of the video conference session by transmitting the second password to those user identifications of users who are associated with a higher user access permission level than the aggregated user access permissions and are authorized to access the recording.

2. The information handling system of claim 1 further comprising:

the collaborative rights information management system separating the recording of the video conference session into a plurality of AV video conference segment session files based on each user's sign-in and sign-out times during the video conference session; and the collaborative rights information management system, via the network interface device, transmitting the second password and decryption data for accessing the whole recording when a first AV video conference segment session file has a security level that requires the user with higher access permission level.

3. The information handling system of claim 1 further comprising:

a rights information management user access permission database to store user access permissions associated with each user identification of a user on a rights information management user access permission database, the user access permissions stored on the rights information management user access permission database defining an access level to the recordings of the video conference session based on the user identification of an email address.

4. The information handling system of claim 1 further comprising:

the collaborative rights information management system separating the recording of the video conference session into a plurality of AV video conference segment session files based on each user's sign-in and sign-out times during the video conference session, the collaborative rights information management system configured to:

assign different security levels to the plurality of AV video conference segment session files; and encrypt the plurality of AV video conference session files in the same video container allowing each user with access permission levels meeting the security levels of corresponding AV video conference segment session files to access those corresponding plurality of AV video conference segment session files via one or more decryption keys.

5. The information handling system of claim 1, wherein the user access permission levels associated with each user are based on content data retained from an enterprise directory describing the positions held by each user within the enterprise and a tiered user access permission associated with the positions.

6. The information handling system of claim 1 further comprising:

the processor executing the collaborative rights information management system to allow access to a user without any assigned security levels to the video conference session and decryption assigning that user without any assigned security levels a default user access permission level, the default user access permission level limiting access to the recording of the video conference session.

7. A method of managing recordings during a video conference session, comprising:

managing the recordation of the video conference session during the execution of the MMCA, via a processor, to create a recording of the video conference session and assign a first password to protect the recording of the video conference session as a default password;

monitoring and aggregating, with the processor, user identification data and access permissions associated with each user accessing the video conference session during the execution of the MMCA;

monitoring each user's sign-in and sign-out times with the user's identification data during the video conference session;

monitoring content presented during the video conference session for security-enhancing stimuli from the context of the videoconference session;

setting a security level associated with the recording of the video conference session based on a detected security-enhancing stimulus;

determining user access permissions associated with each user accessing the video conference session to include user identifications of users having lower user access permission level than meets the designation security level to view the recording;

generating a second password to replace the first password to protect the recording of the video conference session based on the user access permissions associated with each user accessing the video conference session to exclude the user identifications having the lower user access permission level; and permitting access, via the network interface device, to the recordings of the video conference session by transmitting the second password to those user identifications of users who are associated with a higher user access permission level than meets the designated security level and are authorized to access the recording.

8. The method of claim 7 further comprising:

with the execution of the collaborative rights information management system by the processor, separating the recording of the video conference session into a plurality of AV video conference segment session files based on each user's sign-in and sign-out times during the video conference session and the access permission of the user identification for that user; and the collaborative rights information management system, via the network interface device, transmitting the second password for accessing the whole recording when a first AV video conference segment session file has a security level that requires the user with higher access permission level.

9. The method of claim 7 further comprising:
with the execution of the collaborative rights information management system by the processor, separating the recording of the video conference session into a plurality of AV video conference segment session files based on when the security-enhancing stimuli is detected, the security-enhancing stimuli including the detection of the presentation of a proprietary document; and
the collaborative rights information management system, via the network interface device, transmitting the second password for accessing the whole recording when a first AV video conference segment session file has a security level that requires the user with higher access permission level.

10. The method of claim 7 further comprising:
with the execution of the collaborative rights information management system by the processor, separating the recording of the video conference session into a plurality of AV video conference segment session files based on when the security-enhancing stimuli is detected; and
the collaborative rights information management system presenting a third password to access a first AV video conference segment session file having a security level that requires a lower user access permission level but excludes access to a second AV video conference segment session file that requires a higher user access permission level.

11. The method of claim 7 further comprising:
separating the recording of the video conference session into a plurality of AV video conference segment session files based on each user's sign-in and sign-out times during the video conference session;
assigning different security levels to the plurality of AV video conference segment session files; and
including the plurality of AV video conference session files in the same video container allowing each user with access permission levels meeting the security levels of the AV video conference segment session files to access the plurality of AV video conference segment session files.

12. The method of claim 7, wherein the detected security-enhancing stimuli includes changes to an aggregate user access permissions associated with those participating in the video conference session and adjusting a security level associated with the video conference session.

13. The method of claim 7, wherein the detected security-enhancing stimuli includes detecting a security level of content shared with the participants that indicates a higher user access permission level of the video conference session.

14. The method of claim 7, wherein the detected security-enhancing stimuli includes a prompting from a host of the video conference session that presenting a proprietary document during the video conference session increases the user access permission level.

15. An information handling system as a host server during a video conference session, comprising:
a processor;
a memory;
a power management unit;
a multimedia multi-user collaboration application (MMCA) web application programming interface (API) executable by the processor to, via a network interface device, coordinate the transmission of AV data over a network sent to and from a plurality of client devices;
the processor configured to execute a collaborative rights information management system to:
manage the recordation of the video conference session during the execution of the MMCA to create a recording of the video conference session;
the processor to monitor and aggregate user identification data and access permissions associated with each user accessing the video conference session during the execution of the MMCA;
monitor each user's sign-in and sign-out times with the user's identification data during the video conference session;
the collaborative rights information management system separating the recording of the video conference session into a plurality of AV video conference segment session files;
determine user access permissions associated with each user accessing the video conference session to include user identifications of users having lower user access permission level than is allowed to view the recording;
assign a security level to the recording of the video conference session based on a level or affiliation of users participating, a topic of the video conference session, or materials shared during the video conference session;
generate a password to protect a first segment of the AV video conference session recording of the video conference session based on aggregated user access permissions associated with each user accessing the video conference session to exclude the user identifications having the lower user access permission level; and
permit access, via the network interface device, to the whole recording of the video conference session by transmitting the password and decryption key to those user identifications of users who are associated with a higher user access permission level than the aggregated user access permissions and are authorized to access the recording.

16. The information handling system of claim 15 further comprising:
the collaborative rights information management system separating the recording of the video conference session into a plurality of AV video conference segment session files based further on sensitivity of presentation material shared during the video conference session.

17. The information handling system of claim 15, further comprising:
the collaborative rights information management system, via the network interface device, transmitting a second password for accessing a second AV video conference segment session with a security level that requires the user to have at least a lower permission level.

18. The information handling system of claim 15 further comprising:
storing user access permissions associated with each user identification of a user on a rights information management user access permission database, the user access permissions stored on the rights information management user access permission database defining an access level to the recordings of the video conference session including user identification of an email address.

19. The information handling system of claim 15 further comprising:
the collaborative rights information management system configured to:
assign different security levels to the plurality of AV video conference segment session; and
encrypt the plurality of AV video conference session files in the same video container allowing each user with access permission levels meeting the security levels of the corresponding AV video conference segment session files to access those corresponding plurality of AV video conference segment session files.

20. The information handling system of claim 15, further comprising:
allowing access to a user external to an enterprise to the video conference session including shared presentation materials and assigning that external from the enterprise a default user access permission level, the default user access permission level limiting access to the recording of the video conference session.

\* \* \* \* \*